United States Patent [19]
Freeman et al.

[11] Patent Number: 5,551,975
[45] Date of Patent: Sep. 3, 1996

[54] STRUCTURED PIGMENT COMPOSITIONS, METHODS FOR PREPARATION AND USE

[75] Inventors: Gary M. Freeman, Macon; Kurt H. Moller, Warner Robins; Richard D. Carter, Macon, all of Ga.

[73] Assignee: J. M. Huber Corporation, Locust, N.J.

[21] Appl. No.: 264,579

[22] Filed: Jun. 23, 1994

[51] Int. Cl.$^6$ ...................................................... C04B 14/04
[52] U.S. Cl. .......................... 106/485; 106/416; 106/450; 106/464; 106/468; 106/486; 106/DIG. 4; 162/135; 162/181.8; 428/402; 428/403; 501/141; 501/144
[58] Field of Search ..................... 106/416, 450, 106/464, 468, 485, 486, DIG. 4; 501/141, 144; 428/402, 403; 162/135, 181.8

[56] References Cited

U.S. PATENT DOCUMENTS

| | | | |
|---|---|---|---|
| 3,915,725 | 10/1975 | Takahashi | 106/672 |
| 4,374,044 | 2/1983 | Schaefer et al. | 502/80 |
| 4,812,299 | 3/1989 | Wason | 423/328 |
| 4,844,790 | 7/1989 | Occelli | 208/46 |
| 4,879,181 | 11/1989 | Fitzgibbon | 501/127 |
| 4,995,964 | 2/1991 | Gortsema et al. | 502/84 |
| 5,078,793 | 1/1992 | Caton | 106/417 |
| 5,160,371 | 11/1992 | Ito | 106/417 |
| 5,165,915 | 11/1992 | Tokubo et al. | 106/417 |
| 5,167,707 | 12/1992 | Freeman et al. | 106/416 |
| 5,186,746 | 2/1993 | Freeman | 106/416 |
| 5,352,287 | 10/1994 | Wason et al. | 106/416 |

FOREIGN PATENT DOCUMENTS

WO92/03387  3/1992  WIPO.

Primary Examiner—Mark L. Bell
Assistant Examiner—Scott L. Hertzog
Attorney, Agent, or Firm—Lowe, Price, LeBlanc & Becker

[57] ABSTRACT

Pigments for use in paper are comprised of structured aggregate clays which are reaction products of kaolin clays and colloidal silicas. Silica modified clays of low treatment level can under certain high-shear mixing conditions be attritioned back to their starting clay particle size consequently yielding silica coated clay particles that provide unique properties. Also provided are structured aggregate clay products produced by the reaction of kaolin clay, colloidal silicas and spacer particles such as titanium dioxide, which products have improved porosity and light scattering characteristics. Also provided are clay slurry products which comprise mixtures of the reaction product of kaolin clay and colloidal silica, and optionally titanium dioxide, blended with other clay products.

84 Claims, 15 Drawing Sheets

Particle Size Properties of C.S. Modified HG-90 Pigments: Structuring as a Function of SiO2 Treatment Level Malvern = Laser Light-Scattering P.S. Method Particle Size Properties of C.S. Modified HG-90 Pigments: Structuring as a Function of SiO2 Treatment Level Particle Size Properties of C.S. Modified HG-90 Pigments: Structuring as a Function of Colloidal Silica Type

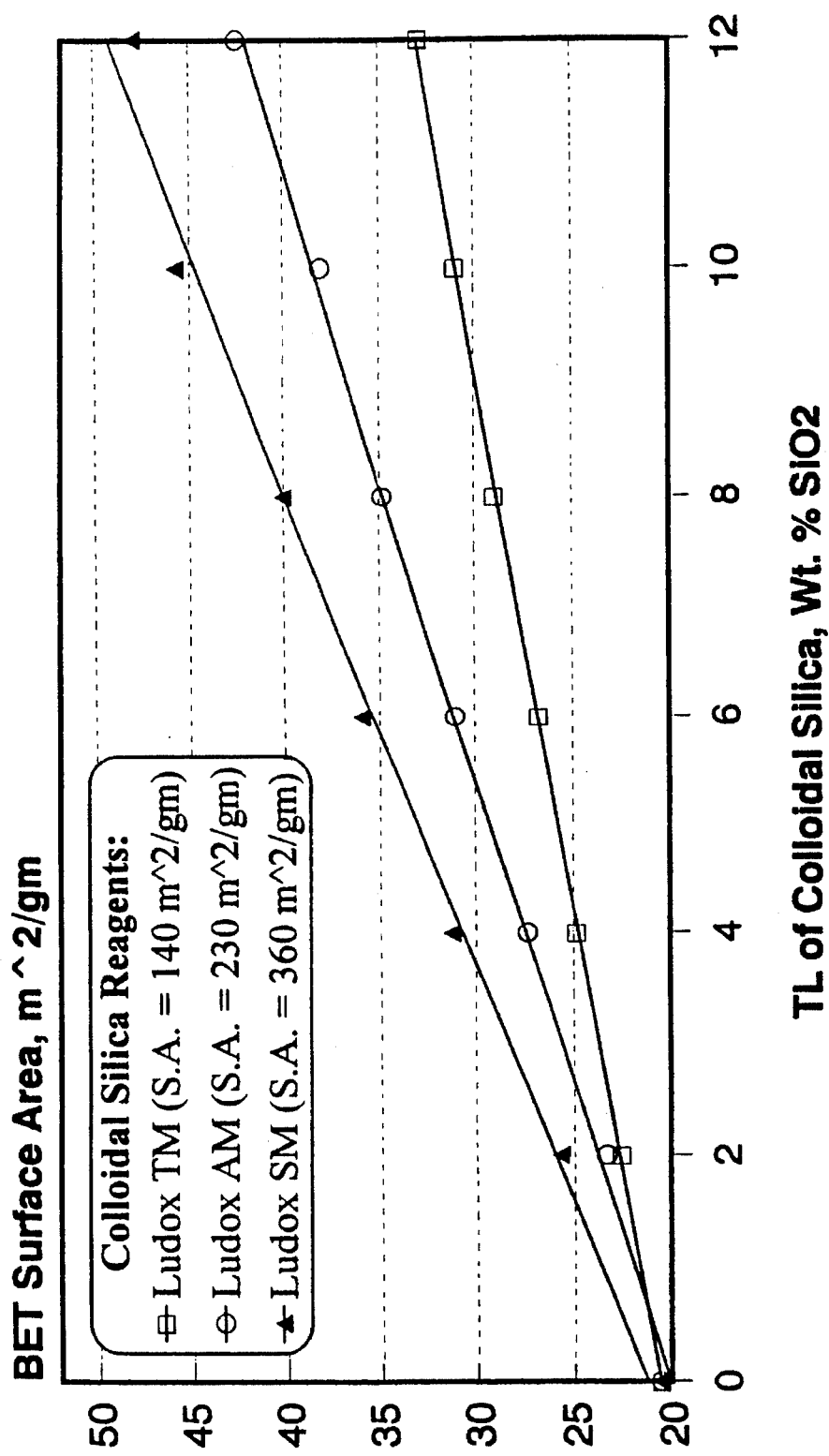

Particle Size Histograms for C.S. Modified HG-90 Pigments: Chemical Structuring at Low SiO2 Treatment Levels (Data on Slurries Produced at 50% Solids)

Colloidal Silica Reagent = Bindzil 30/360 (S.A. = 360 m^2/gm)

SEDIGRAPH P.S. CURVES for C.S. Modified HG-90 Pigments: Chemical Structuring at Low SiO2 Treatment Levels (Data on Slurries Produced at 50% Solids)

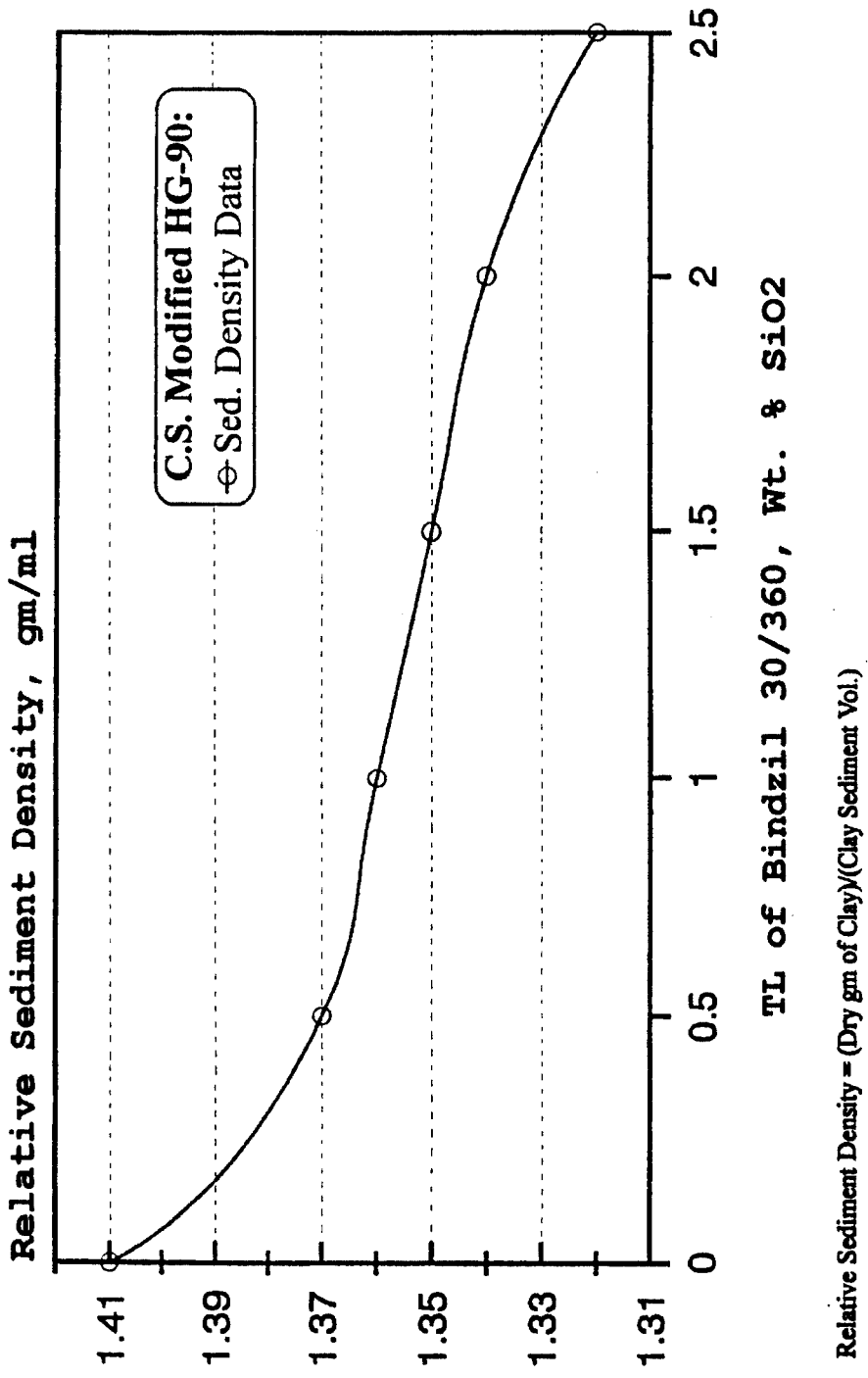

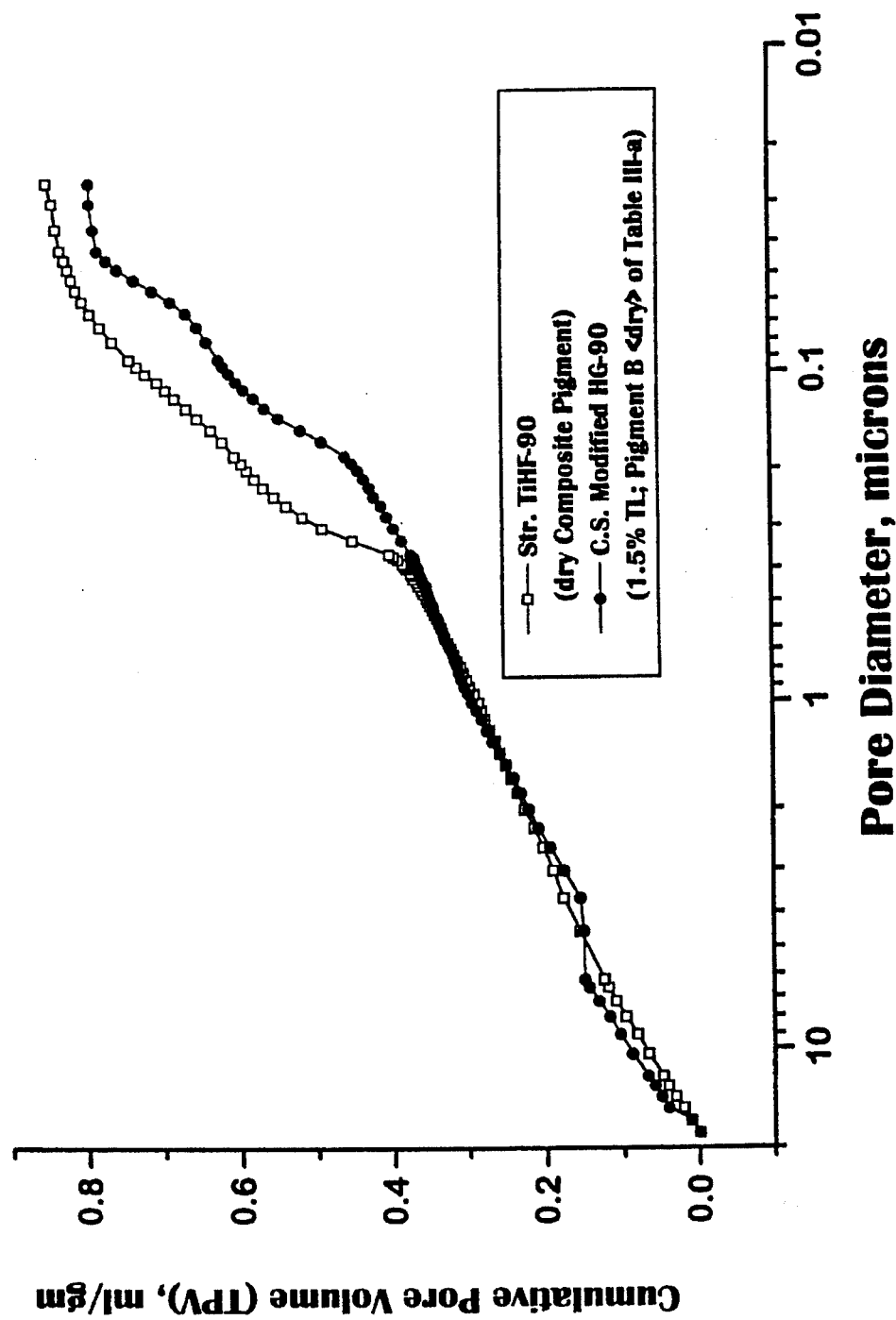

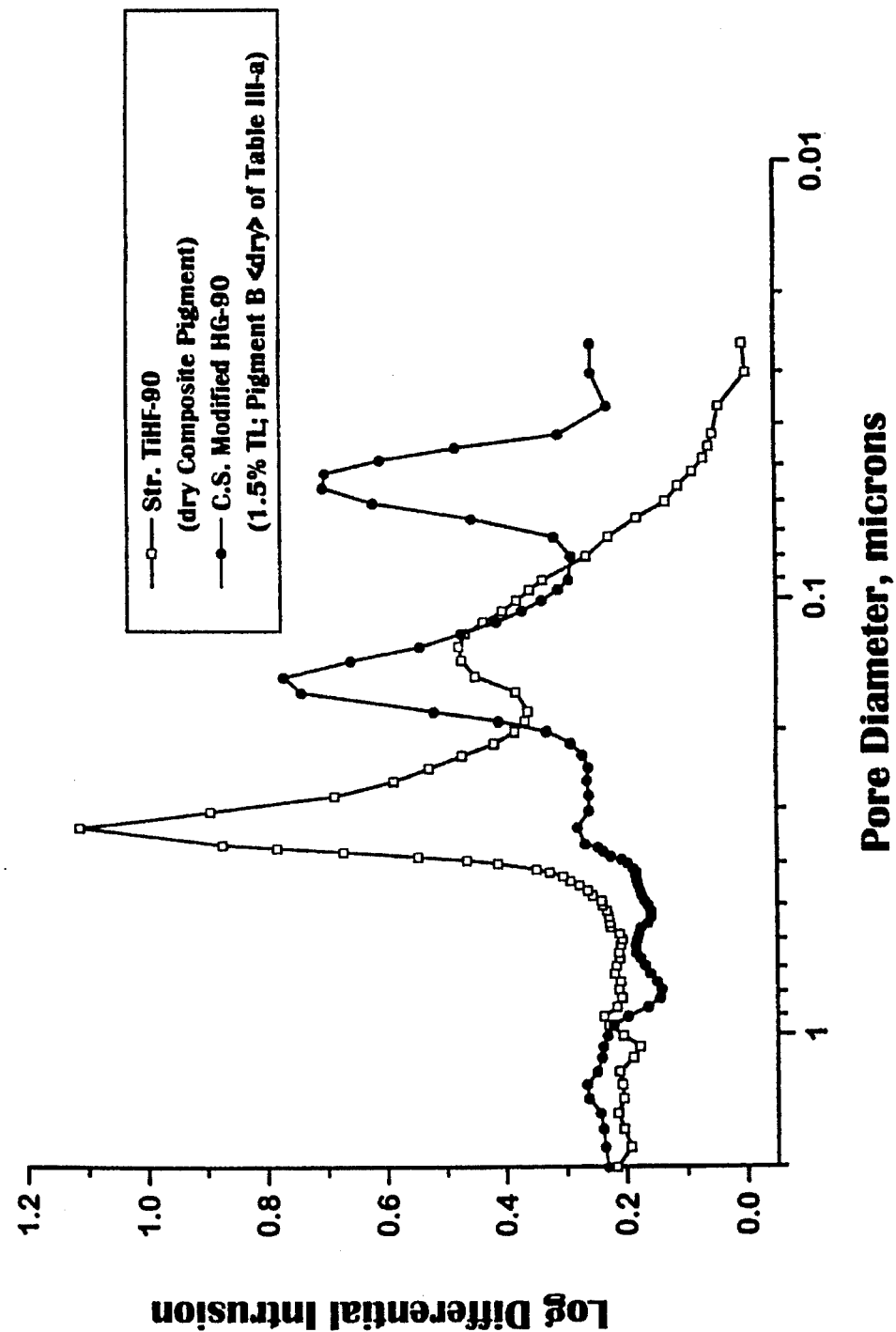

Comparative Pore Structure of HSS Pigments from HF-90 DL & HG-90 Feedstocks

Preferred Process Scheme for Producing Structured Pigment Slurries of this Invention

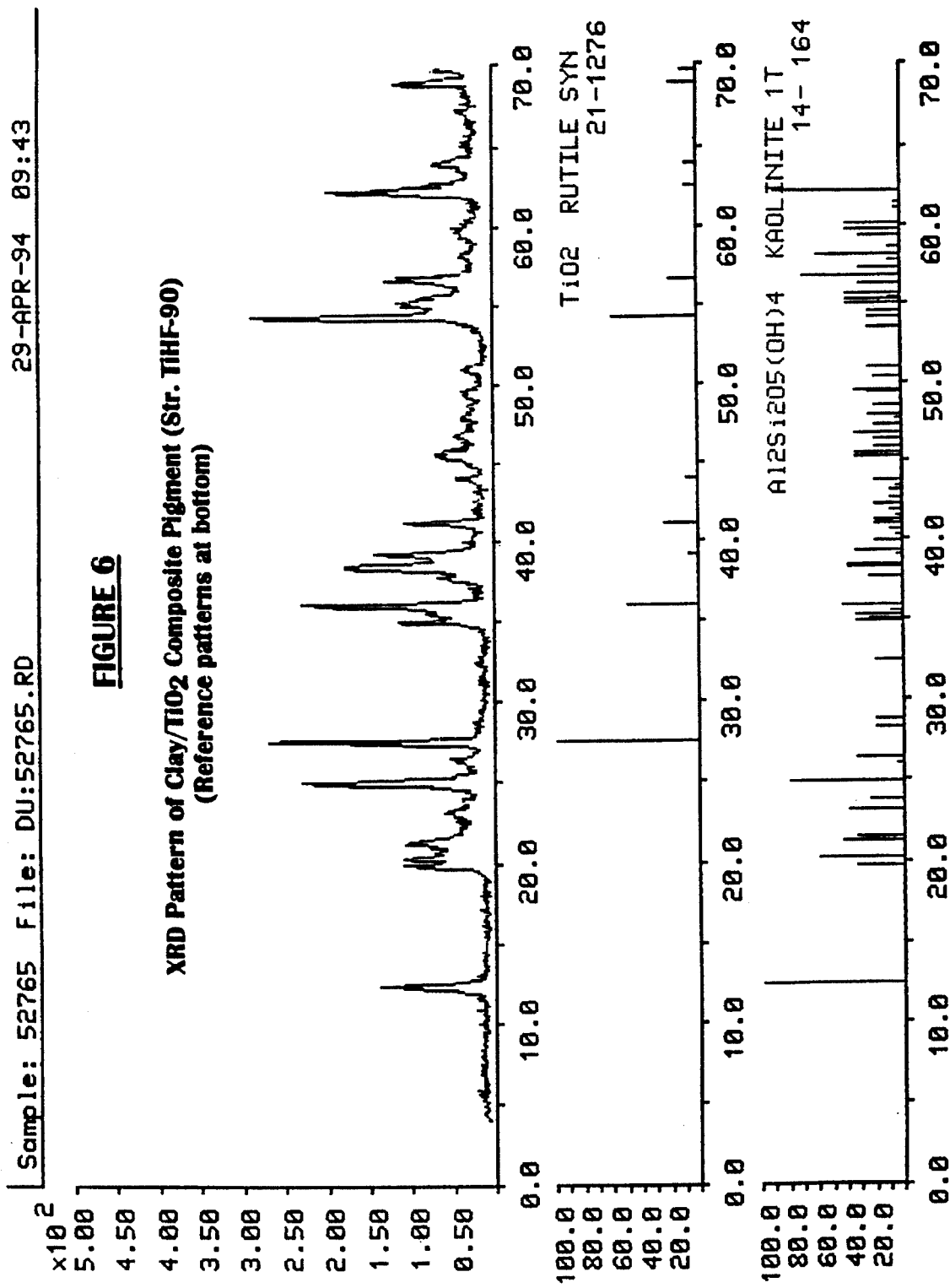

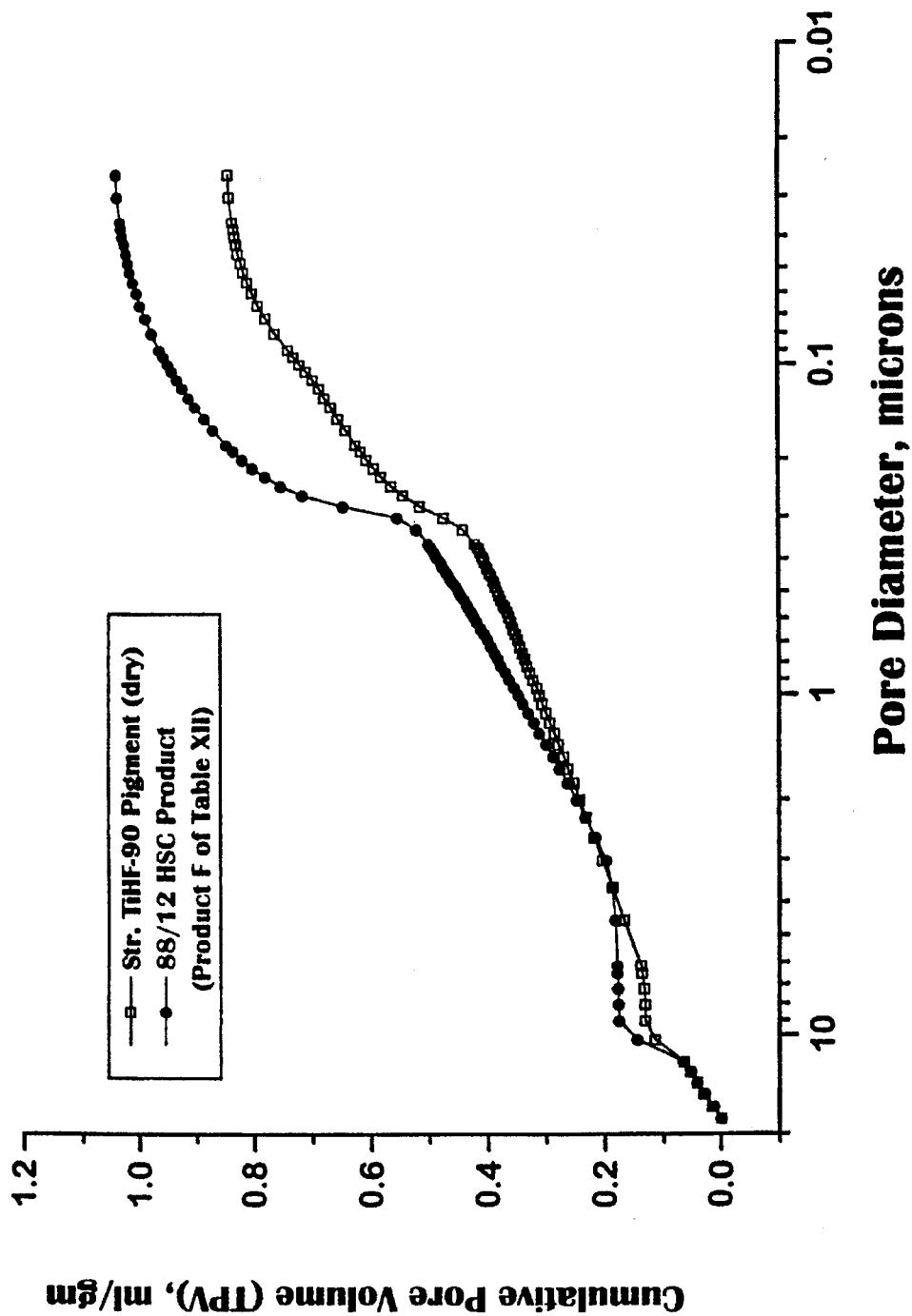

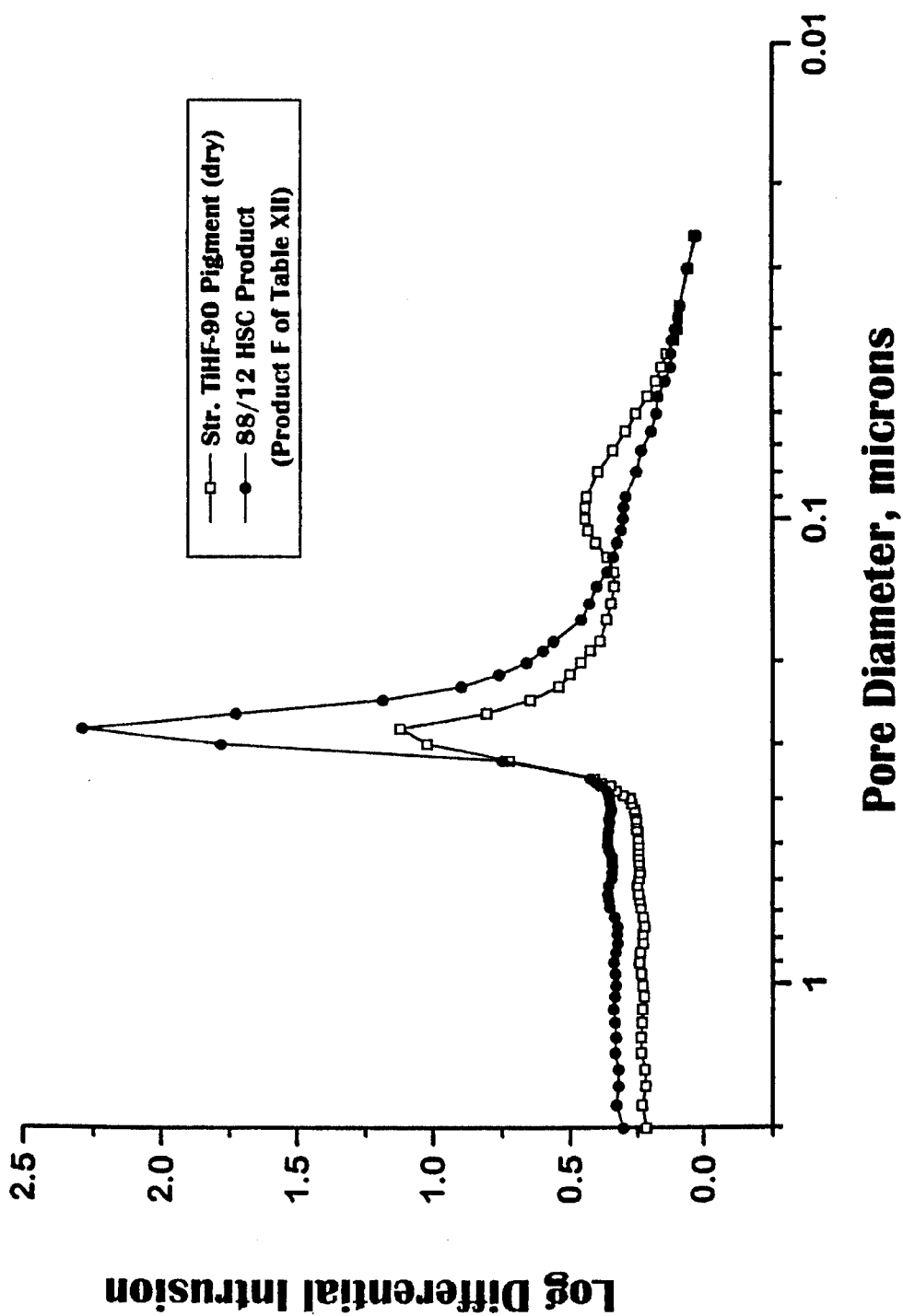

Comparative Pore Structure of HSC and HSS Products

Comparative Pore Structure of HSC and SAMS-5002 Slurry Products

STRUCTURED PIGMENT COMPOSITIONS, METHODS FOR PREPARATION AND USE

FIELD OF THE INVENTION

This invention relates to structured pigment compositions formed by the reaction of colloidal silicas and clays, and more particularly relates to structured composite pigments which are reaction products of clay, colloidal silicas, and optional spacer particles such as titanium dioxide, methods for preparation of the structured composite pigment, and paper and paint compositions containing such composite pigments.

BACKGROUND ART

Coatings are applied to paper and fillers are utilized in paints or paper to improve various qualities including printing quality and optical properties such as brightness, opacity and gloss. Sodium aluminosilicates are well known as paper pigments. An important group of sodium aluminosilicates are the composite products produced by the hydrothermal reaction between kaolin clay and alkali metal silicates as described in U.S. Pat. No. 4,812,299. These composite products are described as altered kaolin clay platelets which have an integral rim or protuberance of essentially amorphous alkali metal silicate-kaolin clay reaction product. The composite compositions are structured materials in which the degree of structure is controlled depending on reaction conditions.

An improved structured sodium aluminosilicate composite paper pigment is described in PCT Publication WO92/03387 and U.S. Pat. No. 5,186,746. The structured sodium aluminosilicates described in these publications are produced by the reaction of sodium silicates and kaolin clay under hydrothermal conditions. The composite products are characterized by having low oil absorption values and high total pore volumes. These products offer high performance properties despite their low oil absorption characteristics.

The present invention provides an improved group of structured pigments which have optimum pore structures and improved slurry rheology at higher solids contents than the prior art.

SUMMARY OF THE INVENTION

It is accordingly one object of the present invention to provide a novel class of composite pigments which are useful as paper coating pigments and as paper and paint fillers.

A further object of the invention is to provide novel composite structured pigments produced from the reaction of clays and colloidal silica, which pigments have improved slurry rheology and morphology for use as paper coating pigments and as paper and paint fillers.

A still further object of the invention is to provide an improved composite pigment which has better rheology than known sodium aluminosilicate paper pigments, which pigments can be provided to the paper industry as higher solids slurries than those known to the art, and can be provided with spacer particles to control product porosity at desired levels.

An even further object of the invention is to provide a method for preparation of the novel pigments of this invention comprising the reaction of a clay with a colloidal silica to produce a structured aggregate clay product, which product can be further reacted with a spacer particle such as $TiO_2$ to modify its pore size distribution, increase its total pore volume, and thereby improve pore structure properties pertinent to providing opacity.

It is a still further object of the invention to provide modified clays of low colloidal silica treatment levels through slurry make-down shear, which are no longer structured pigments but are surface modified slurry products offering higher solids, improved Hercules viscosity and improved IGT values as compared to untreated clays.

Other objects and advantages of the present invention will become apparent as the description thereof proceeds.

In satisfaction of the foregoing objects and advantages, the present invention provides structured pigments comprising the reaction product of a clay and colloidal silica.

In a further aspect of the invention, a paper pigment having an optimum pore structure is prepared by the reaction of a clay, a colloidal silica and a spacer particle such as titanium dioxide.

In a still further embodiment, the present invention provides a structured pigment in slurry form, which pigment comprises the reaction product of a clay, colloidal silica, and a spacer particle such as titanium dioxide, and optionally contained in an aqueous suspension or slurry in admixture with a clay such as kaolin clay, natural clays, delaminated clays, structured sodium aluminosilicates or calcined clay. Also provided by the present invention are paper and paint products which contain the structured composite pigments of the present invention.

The present invention also provides processes for the preparation of the structured pigments of this invention, which processes comprise the reaction of kaolin clay with a colloidal silica to form a structured pigment comprising a colloidal silica/clay reaction product. In a further embodiment, the structured colloidal silica/clay reaction product is spray dried to powder form, and optionally formed as an aqueous slurry. In a still further embodiment, the structured colloidal silica/clay reaction product is further reacted with spacer particles such as titanium dioxide to increase the optimum pore structure. In a further process embodiment, the clay slurry may be combined with the colloidal silica and spacer particles such as titanium dioxide simultaneously via in-line metering of the colloidal silica and titanium dioxide for reaction with the clay.

The present invention also provides processes for preparation of novel paper products by incorporation of about 1–50 wt. % of the structured pigments of this invention into the paper as coatings and fillers. Included in the embodiments of the invention are methods for extending titanium dioxide in paper board coatings by incorporation of about 1–50 wt. % of the composite pigments of the present invention into the paper board coating.

BRIEF DESCRIPTION OF THE DRAWINGS

Reference is now made to the drawings accompanying the application, wherein:

FIG. 1c is a graph comparing the treatment levels of colloidal silica on the surface area of a modified clay pigment of the invention;

FIG. 2c is a graph showing the relative sediment density as a measure of bulking properties of a clay pigment modified with a specific colloidal silica;

FIG. 3a is a graph showing the comparative pore structure in terms of cumulative pore volume of a clay-titanium dioxide composite compared with a colloidal silica modified clay pigment of the invention;

FIG. 3b is a graph showing the comparative pore structure in terms of pore size populations of a clay-titanium dioxide composite compared with a colloidal silica modified clay pigment of the invention;

FIG. 6 is an X-ray diffraction pattern of a clay-titanium dioxide composite pigment of this invention with reference patterns;

FIGS. 7a and 7b are graphs showing the comparative pore structure properties of a clay-titanium dioxide composite pigment versus that of a blend of the composite pigment with calcined clay as per the invention;

DESCRIPTION OF THE INVENTION

Figure 1A:
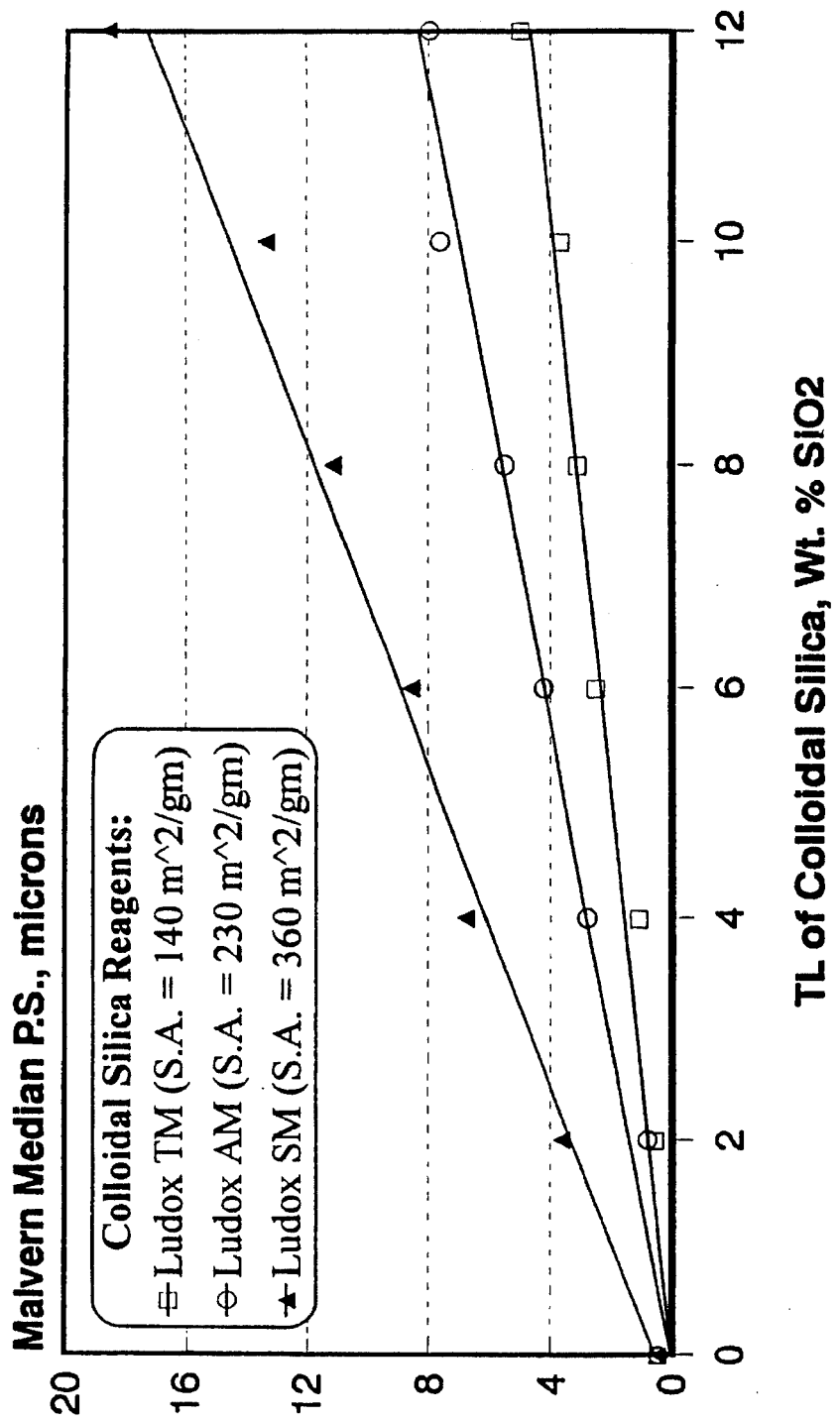
FIG. 1a is a graph comparing different treatment levels of colloidal silicas in weight percent on the particle size of a modified clay pigment of the invention.

The present invention is concerned with a novel group of structured composite pigments which have particular utility as paper pigments and paint pigments. The pigments of the invention in the basic embodiment are reaction products of a clay and colloidal silica. The pigments are structured aggregate clays which have excellent properties as paper pigments.

The structured aggregate clays of this invention are prepared by the treatment of a clay, preferably a kaolin clay, preferably in the form of a filter cake slurry. The kaolin clay is initially treated with colloidal silica, preferably in suspension form at ambient temperatures. After treatment, a particularly advantageous procedure is to inject the clay slurry/colloidal silica reaction mixture into a spray dryer to initiate the bonding reaction and thereby produce the structured aggregate clays.

The clay to be used as a reaction product in the invention may be any commercially available clay mineral but preferably is a product known as kaolin clay. Included in this definition, however, are Tertiary clays, delaminated clays, primary clays, and Cretaceous clays but including any clay product which is effective to react with colloidal silica in accordance with the teachings of this invention.

The colloidal silica reactant can be any of several colloidal silicas known to the prior art and available commercially. Such liquid colloidal silicas usually contain about 5–50% $SiO_2$ by weight in water and can be of any desired particle size. It is preferred in this invention that the colloidal silica be a fine particle size colloidal silica.

Particularly useful colloidal silicas for use in the invention are sold commercially by DuPont as Ludox® Colloidal Silica and by Eka Nobel as Bindzil. Such colloidal silicas have typical properties such as $SiO_2$ contents of about 30–50 wt. %, surface areas ranging from 140–360 $m^2/g$, and average particle diameters ranging from 7–22 nm. The preferred colloidal silica is a silica containing about 30 wt. % $SiO_2$ with an average particle diameter of 7 nm and a surface area of 360 $m^2/g$. For purposes of this invention, the smaller the particle size of the colloidal silica used, the higher the extent of clay aggregation obtained in the final structured product. A preferred colloidal silica is sold by DuPont as Ludox® Grade SM.

The treatment of a kaolin clay with colloidal silica is conducted in an aqueous medium at room temperature. In general, an aqueous suspension of the kaolin clay preferably containing 15–60% clay solids is thoroughly mixed with the colloidal silica under low shear mixing conditions. In a preferred embodiment, the kaolin clay is treated with about 0.2–12 wt. % of the colloidal silica. Preferably the treatment level of colloidal silica is about 0.5–5 wt. %.

After the low shear mixing is concluded, the treated clay is then preferably dried by introducing the reactant mixture in suspension into a spray drier under conventional spray drying conditions. Preferred conditions include an entrance temperature of about 1100° F. and an exit temperature of about 250° F.

The products recovered at this stage are structured aggregate reaction products in which the colloidal silica particles appear to act as an adhesive agent or binder to bind the clay particles together. The spray drying process appears to drive the bonding reaction nearly to completion wherein the active surface hydroxyl groups on the clay react with those on the colloidal silica particles. As a result of the reaction, the surface of the clay is modified and the aggregate product comprises clay particles aggregated by layers of silica so as to provide a product having a larger BET surface area than the starting clay material. At typically useful levels of colloidal silica, the product surface area will have a BET surface area of 1–30 $m^2g$, preferably 2–10 $m^2/g$ higher than the original clay surface area. In general, the surface area of the composite products will range from 10–35 $m^2/g$ depending on the choice of starting clay.

The pigment products of this invention are described as structured aggregates. The structured products correlate to total pore volume of the products. Total pore volume is measured by mercury intrusion porosimetry in accordance with the teachings of U.S. Pat. No. 5,186,746. The pigment structure definitions are described herein in Table VIII-b. In general a very high structure product will have a total pore volume as measured in ml/g of above 3.3, a high structure pigment will have a total pore volume of 2.5–3.3, a medium structure pigment will have a pore volume of 1.6–2.5, a low structure pigment will have a total pore volume of 0.8–1.6, and a very low structure pigment will have a total pore volume of less than 0.8.

A novel feature of the products of the present invention is the ability to form high solids content slurries or high solids suspensions with the structured products. The modified structured clays of the present invention can be provided in slurry form having solids contents of as high as 67%. This important characteristic is made possible by the improved Hercules viscosity of the products. Hercules viscosity is a measurement of high shear viscosity and correlates to product slurry pumpability and paper coating runnability. In general, under Hercules measurement conditions of A-Bob at 1100 rpm, a slurry having a Hercules viscosity value below 18±400 rpm is not pumpable with a high speed centrifugal pump as are typically employed in paper mills. A preferred product will have a Hercules viscosity of at least 18±500 rpm. The structured modified clays of this invention repeatedly demonstrate Hercules viscosity values greater than 18±500 rpm at high slurry solids.

The product recovered from the spray dryer is a structured aggregate clay in dry powder form containing the reaction product of clay particles and colloidal silica particles. The structured aggregate product is a useful paper pigment. However, it has been found that light scattering characteristics of the clay/colloidal silica structured aggregate clay are not optimum and insufficient opacity may be imparted to the paper by this pigment. An optimum structured pigment would have substantial porosity wherein the mean pore size is about 0.3 microns in diameter, which equals one-half the wavelength of visible light. Accordingly, in a further embodiment of the invention, the structured clay/colloidal silica aggregate is further modified so as to shift the diameter pore size into the most effective opacifying range. In these experiments it was found in one embodiment that optical properties could be improved by the use of fine particle delaminated clays such as the clay sold by J. M. Huber Corporation under the designation Hydrafine-90DL. This is a Number 1 clay having a median Malvern particle size of about 2.0 microns. The use of this clay improves the porosity of the structured pigment.

A further and significant modification to improve porosity and optical properties is to add a third component to the reaction which has a particular particle shape and particle size. This increases the amount of total pore volume by 10–25% but more importantly increases the amount of porosity with pore diameters near 0.3 micron in size. It was discovered that if 0.2–0.3 micron size particles in the form of spheres or blocks or similar shapes, such as those of $TiO_2$, $SiO_2$, ATH (aluminum tri hydroxide), $CaCO_3$, $ZrO_2$, or mixtures thereof, are added to the reaction, the particles will act as spacers between the clay platelets so that the clay particles will not be predominantly bonded together in face to face fashion in the aggregate product. The spacer particles will create additional voids within the structure aggregates in the 0.2–0.3 micron diameter size range.

The addition of the spacer particles provides sufficient improvements in pore structure to result in a product which has a porosity of about 0.3 microns in diameter. About 3–25 wt. % of the spacer particles are preferably added to the reaction, based on the weight of the clay. While any particles of the type mentioned may be used, titanium dioxide is particularly preferred because of availability and because $TiO_2$ provides certain refractive index advantages. Rutile $TiO_2$ or Anatase $TiO_2$ may be used and alumina coated versions of these $TiO_2$ forms are preferably used. Therefore, in a further embodiment of the invention, there is provided a process for the preparation of an aggregate or composite pigment product which has optimum porosity characteristics for use as a paper pigment, which product is produced by the reaction of a kaolin clay, colloidal silica, and a spacer particle such as titanium dioxide. It is preferred that the clay be a fine particle delaminated kaolin clay such as the J. M. Huber Corporation's Hydrafine™ 90-DL, and that the colloidal silica reagent be one of the colloidal silicas discussed above. Titanium dioxide is the preferred spacer particle in the form of spheres or blocks. In the structuring reaction, the components are used in a preferred weight ratio of about 82–89 parts clay, about 1–3 parts colloidal silica, and about 10–15 parts of spacer particle (titanium dioxide).

In preparing the products of the invention, the preferred colloidal silica to be reacted with the clay is negatively charged and has a colloidal size ranging from 2–100 nm in particle size (0.002–0.1 microns). The preferred particle size is 7–9 nm. The composition of the colloidal silica is preferably essentially all silica. Some commercially available silicas may be surface altered such as by reaction with alumina, and altered colloidal silicas may also be used in the process. In general, the finer the particle size of the colloidal silica, the higher its surface area and resultant greater reactivity in producing the structured pigments. Further, the higher the surface area of the colloidal silica reagent, the lower its available $SiO_2$ wt. % activity in water. Also, on the other hand, the higher the surface area, the greater the high shear rheological benefits provided to the modified clay up to a colloidal silica surface area of about 360 $m^2/g$.

It is a feature of the invention that the colloidal silica/clay reaction products and the colloidal silica/$TiO_2$/clay reaction products can be mixed or blended with commercially available clays to obtain special properties. Thus, the structured silica modified clays of this invention may be blended with 1–99 wt. %, preferably 5–60 wt. % of other clay products such as calcined clays, delaminated clays, processed clays, Cretaceous clays, fine particle Tertiary clays, structured sodium aluminosilicates, such as those sold by J. M. Huber Corporation under the tradename SAMPAQUE, and mixtures thereof. It is particularly useful to provide blends of the colloidal silica modified clays of this invention with other clays in slurry form as it enables the preparation of higher solid slurries which are desired by the paper industry.

In the paper industry, paper pigments are preferably purchased in slurry form for direct addition to the paper furnish or to the coating formulation. Because the silica modified clays of this invention often exhibit more thixotropic-like slurry behavior, blends of these silica modified clays with delaminated clays, calcined clays, or structured sodium aluminosilicates (SAMS) of the type described in U.S. Pat. Nos. 4,812,299 and 5,186,746 are particularly beneficial. Blends of these clays in slurry form provide a stable slurry product. Delaminated clays and structured clays typically exhibit very dilatant slurry rheology, which can be greatly moderated when they are used in blends with the products of this invention. Dilatancy limits slurry solids and decreases the runnability of paper coating.

A preferred procedure for blending with structured sodium aluminosilicates (SAMS) is to provide a sodium aluminosilicate as described in U.S. Pat. No. 4,812,299 or 5,186,746 in dispersed filter cake form. The dispersed filter cake contains substantial water and generally will contain about 15–30 wt. % solids. To this dispersed filter cake slurry is added the dry composite structured modified clay of this invention to build solids via blending. The resulting makedown blend produces a product slurry which can be maintained at a solids content of as high as 67% solids. A preferred slurry product will contain about 88 parts by weight of the clay/silica/$TiO_2$ reaction product aggregate of this invention and about 12 parts of sodium aluminosilicate or calcined clay. The slurry product of this invention provides a better high-shear rheology at higher solids than structured products known to the art.

A preferred process for producing the silica modified clays of this invention comprises in-line treatment using a continuous in-line injection system. The selected clay filter cake slurry is treated in a continuous manner with the colloidal silica and a spacer particle such as titanium dioxide just prior to the spray-drying step. In a preferred batch type procedure, a mixing vessel is provided into which a slurry or suspension of the selected clay is introduced. The suspension or slurry of the clay is maintained under low shear mixing conditions, preferably at an ambient temperature and neutral pH conditions. The selected amounts of colloidal silica and titanium dioxide are then preferably added simultaneously to the clay slurry. In the preferred procedure, the colloidal silica and titanium dioxide are metered into the clay slurry in the selected controlled ratios using flow meters. After being well mixed, the resulting mixture is then continuously introduced into a spray drier under the drying conditions set forth herein and the dried product recovered from the spray drier.

A feature of this process is the continuous contact between the clay suspension, the titanium dioxide and silica. Uniform mixing is highly desirable in production of products having uniform characteristics in that the colloidal silica and titanium dioxide would be uniformly aggregated with the clay particles.

Figure 5:
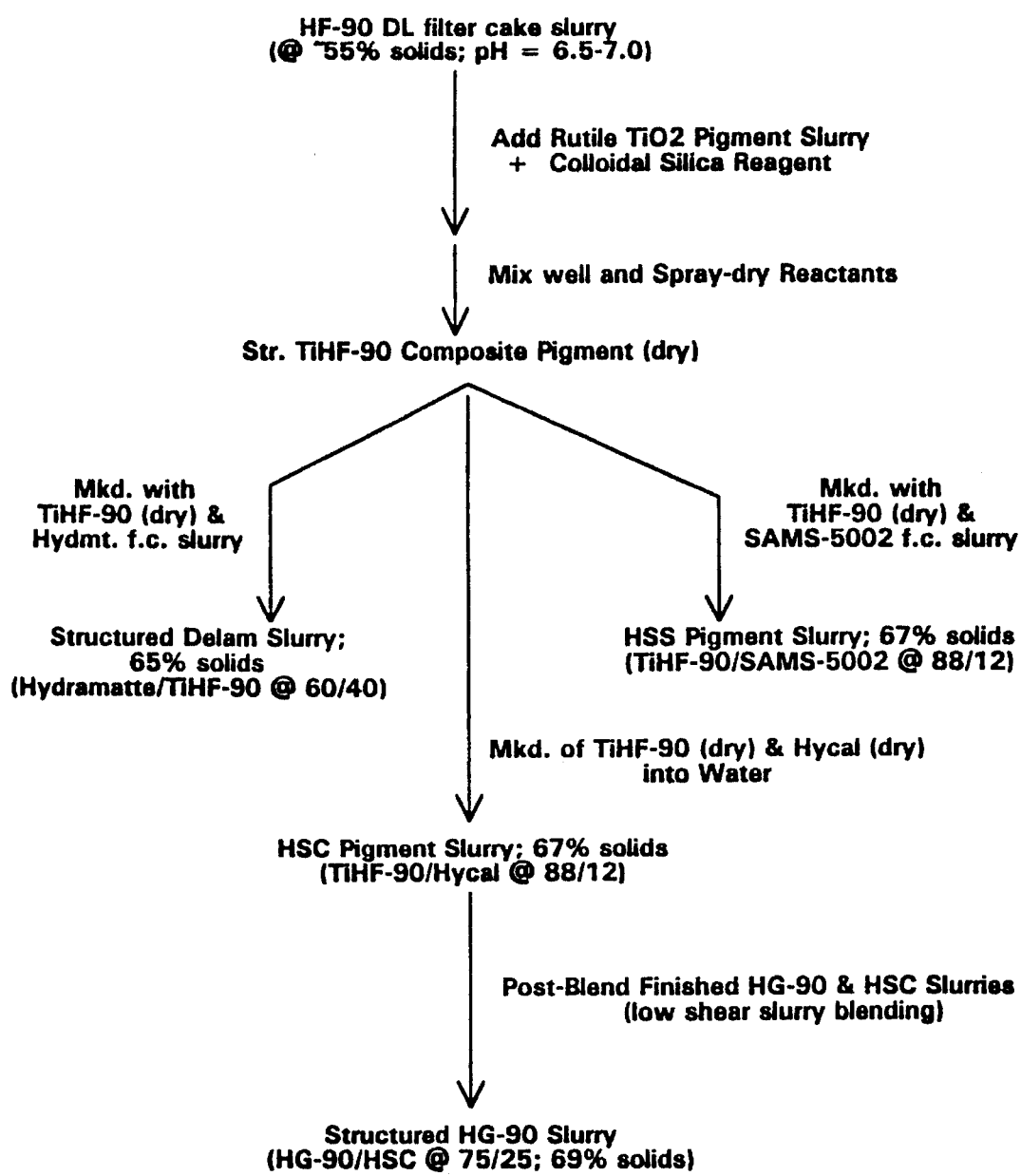
FIG. 5 is a schematic of a preferred process for producing the structured pigment slurries of this invention.

A preferred process scheme for producing structured pigment slurries of this invention is shown in FIG. 5 accompanying the application. In this Figure, the indicated clay is a Hydrafine-90 DL filter cake slurry maintained at about 55% solids at a pH of 6.5 to 7.0. To this slurry is added rutile titanium dioxide pigment slurry and the colloidal silica reagent. Good mixing is achieved and the mixture passes through the spray drier to produce the dried, structured titanium dioxide containing Hydrafine-90 composite pigment (Str. TiHF-90). This composite pigment can then be further processed to provide preferred slurry products as described in FIG. 5. In one embodiment, the composite dry pigment is made-down with a slurry of dispersed Hydramatte filter cake which is a very coarse particle size delaminated clay. This make-down results in a structured delaminated clay slurry of 65% solids and contains a 60/40 mixture of the Hydramatte clay and the structured composite pigment.

In an alternative embodiment, the Str. TiHF-90 dry composite pigment is made-down with the commercial calcined clay, Hycal, into water to form a structured pigment slurry blend containing 67% solids in a weight ratio of 88 parts composite pigment and 12 parts Hycal. This structured slurry may be post blended with an ultrafine particle size clay slurry by low shear blending to produce a new structured slurry having a solids content of 69% with the solids being in a 75/25 weight ratio of Hydragloss-90 clay and structured composite clay of the invention.

In still a further embodiment, the dry composite pigment is made-down with a commercial structured sodium aluminosilicate, SAMPAQUE 5002 dispersed filter cake slurry, to form a structured silica pigment slurry containing 67% solids in a 88/12 weight ratio of the composite pigment Str. TiHF-90 and SAMS-5002.

The structured compositions of the present invention have a structure level as defined by porosity and other characteristics which render said products distinct from other paper coating pigments of the prior art. The structured composite products of the present invention have an oil absorption of less than about 50 g/100 grams and preferably about 40 g/100 grams and a total pore volume and defined structured level in the range of 0.85–1.15. The products of the invention are therefore low structured materials as defined herein.

On the other hand, the commercial product SAMPAQUE 5002, a structured sodium aluminosilicate has an oil absorption value of 105 g/100 grams and a total pore volume of 2.85. Therefore, this SAMPAQUE 5002 product is a high structured material. In addition, the calcined clay commercial product Hycal, has an oil absorption value of 80 g/100 grams and a total pore volume of about 1.60, thus, being a medium structured material.

It is also a feature that the new structured clay agregate pigment of this invention has an oil absorption value which is no higher than the starting clay reactant and also has a low pore structure as defined by porosimetry. On the other hand, the product of this invention yields a product slurry which equals or exceeds the performance of a slurry of the calcined clay Hycal or the SAMPAQUE-5002 product. It is also a feature of the invention that the silica modified clays of this invention, which have been treated with low treatment levels of colloidal silica, can under certain high shear mixing conditions be attritioned back to their starting clay particle size. This yields a slurry of silica-coated clay particles which provide unique properties as paper coating compositions.

The invention thus provides a broad range of useful clay products. The colloidal silica modified clays and colloidal silica modified clays containing spacer particles, preferably of titanium dioxide, find wide use because of their unique properties. Blends of these products with conventional clays provide additional benefits.

The following examples are presented to illustrate the invention, but it is not to be considered as limited thereto.

Table I below sets forth examples of colloidal silica reagents useful in producing the modified structured clays of this invention. In this Table, colloidal silicas are identified by their product tradename, by the manufacturer, and by characteristics including the stabilizing counter ion, specific surface area, particle charge, silica weight percent, titratable alkali weight percent, pH, specific gravity, and average particle diameter. It will be noted that the preferred silicas are all negatively charged and those having particle sizes of 7–9 nm (0.007 microns) are highly preferred. Preferred colloidal size is 2–100 nm (0.002–0.1 microns) in particle size. From a compositional viewpoint, these colloidal silicas are essentially $SiO_2$ but can be altered by surface modification as shown by the products identified as Bindzil 159/500 and Ludox AM. In the products shown, with numerical suffixes such as Bindzil 15/500, the first number shows the $SiO_2$ activity in wt. percent and the second number shows the specific surface area in $M^2/g$. Table I is as follows:

TABLE I

EXAMPLES of COLLOIDAL SILICA REAGENTS USEFUL in PRODUCING MODIFIED/STRUCTURED CLAYS of this INVENTION: TYPICAL PHYSICAL PROPERTIES*

| Product Tradename: | Bindzil 15/500 | Bindzil 159/500 | Ludox SM | Bindzil 30/360 | Ludox AM | Ludox LS | Ludox TM | Ludox AS | Bindzil 50/130 | Bindzil 50/80 | Nyacol 9950 |
|---|---|---|---|---|---|---|---|---|---|---|---|
| Manuf. | Eka Nobel | Eka Nobel | Du Pont | Eka Nobel | Du Pont | Du Pont | Du Pont | Du Pont | Eka Nobel | Eka Nobel | PQ Corp. |
| Stabilizing Counter Ion | Sodium | Sodium | Sodium | Sodium | Sodium | Sodium | Sodium | Ammonium | Sodium | Sodium | Sodium |
| Specific Surface Area, $m^2/gm$ | 500 | 500 | 360 | 360 | 230 | 220 | 140 | 140 | 130 | 80 | NA** |
| Particle Charge | neg. | neg. | neg. | neg. | neg. | neg. | neg. | neg. | neg. | neg. | neg. |
| Surface Modification | no | w/ aluminate ions (0.50% by wt. as $Al_2O_3$) | no | no | w/ aluminate ions | no | no | no | no | no | no |
| Silica (as $SiO_2$), wt. % | 15.0 | 14.5 | 30.0 | 30.0 | 30.0 (includes $Al_2O_3$ %) | 30.0 | 50.0 | 40.0 | 50.0 | 50.0 | 50.0 |
| Titratable Alkali (as $Na_2O$), wt. % | 0.40 | 0.40 | 0.56 | 0.55 | 0.24 | 0.10 | 0.21 | 0.16% $NH_3$ + 0.08% $Na_2O$ (occluded) | 0.23 | 0.22 | 0.12 |
| pH (as rec'd) | 10.0 | 9.4 | 10.0 | 9.5–10 | 8.8 | 9.1 | 9.1 | 9.1 | 9–9.5 | 8.5–10 | 9.0 |
| Specific Gravity (@ 25° C.) | 1.1 | 1.1 | 1.2 | 1.2 | 1.2 | 1.2 | 1.4 | 1.3 | 1.4 | 1.4 | 1.4 |
| Av. Particle Diameter, nm | 6 | 6 | 7 | 7–9 | 12 | 12 | 22 | 22 | 25 | 40 | 100 |

Note:
*Physical properties reported here were taken from product literature supplied by the respective chemical manufacturer.
**Value not available from product literature.

EXAMPLE 1

In this example, a starting kaolin clay identified as HG-90, was treated with varying treatment levels of colloidal silica. The kaolin clay, HG-90, is a Number 1 high brightness fine particle Tertiary kaolin clay of the J. M. Huber Corporation. The designation HG means Hydragloss. This clay is available as a dispersed filter cake slurry at 52% solids concentration with a pH of 6.5–7.0.

In this example, samples of HG-90 kaolin clay were treated at the treatment levels of colloidal silica in active weight percent as shown in FIG. 1a. The treatment was carried out by contacting the colloidal silica reagent with the kaolin clay using low shear mixing at ambient temperature. The active treatment level of colloidal silica ranged from 0.2–12% by weight. This range is considered to be the useful treatment level.

After low shear mixing of the kaolin clay and colloidal silica, the resulting treated clay was subjected to spray drying at an inlet temperature of 1000°–1100° F. and an outlet temperature of 250° F. The spray drying process dries the product and also is believed to cause the bonding reaction between the kaolin clay particles and colloidal silica to proceed rapidly and nearly to completion. It is believed that active hydroxyl groups on the clay react with those on the colloidal silica to produce a structured aggregate product.

As may be seen in FIG. 1a, the colloidal silica agents selected were Ludox TM, Ludox AM, and Ludox SM. These colloidal silicas differ in surface area and their specific surface areas are indicated in the graph of FIG. 1a. The HG-90 kaolin clay was treated with the three colloidal silicas in accordance with the amounts and procedure discussed above.

In FIG. 1a, the treatment level of each colloidal silica is plotted against the Malvern Median particle size of the silica modified clay in microns. FIG. 1a shows the product particle size trends based on the different treatment levels. Aggregate product particle size is observed to increase as a function of increasing silica treatment level. Also, FIG. 1a shows that the higher the specific surface area of the colloidal silica reagent employed means greater reactivity in producing structured pigments by the colloidal silica acting as an inorganic binder.

The product produced as a result of this bonding reaction is a structured clay in which the colloidal silica appears to act as a binder or adhesive for the clay particles. The rheological benefits obtained from the colloidal silica treatment of the clay are best measured by the advantages achieved by providing the product as a much higher solids slurry than can be made available by similar products.

On the other hand, the colloidal silica treated clay of this invention is available in solids content of 67–68% as a paper coating.

Figure 1B:
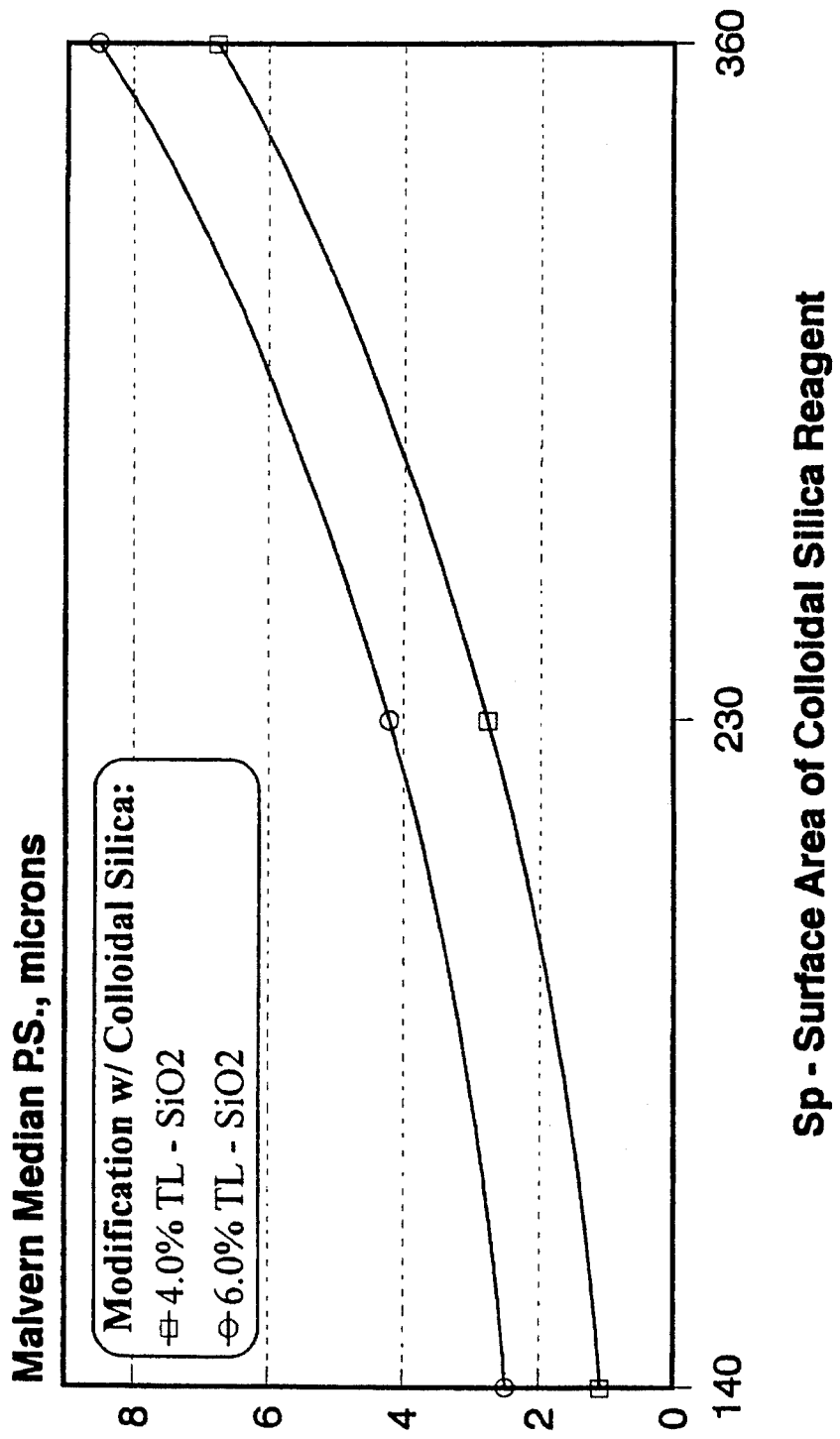
FIG. 1b is a graph comparing the effect of surface area of the colloidal silica reagent in two different treatment concentrations on the particle size of a modified clay pigment of the invention.

FIG. 1b is a graph showing the particle size properties of the colloidal silica modified Hydragloss 90 clay pigments plotted against the specific surface area of various colloidal silica reagents. This graph shows particle structuring as a function of the colloidal silica type. In this graph a 4.0% treatment level of each colloidal silica is compared to a 6.0% treatment level of the same colloidal silicas in regards to their effect on Malvern Median particle size in microns. This is a different way of plotting the data of FIG. 1a and demonstrates the effect of the specific surface area of the colloidal silica reagent resulting product on particle size.

FIG. 1c demonstrates that as a result of modifying the surface of the Hydragloss 90 clay with a colloidal silica to provide layers of SiO$_2$, a substantial increase in the clay's BET surface area is obtained. The product surface area, by BET measurement of the modified clay, will be as much as 30 m$^2$/g higher than the original clay surface area given the use of colloidal silica treatment levels of up to 12% by weight.

EXAMPLE 2

In this example, products according to the invention are prepared by reaction of Hydragloss 90 clay, a Number 1 high brightness East Georgia fine particle Tertiary clay, by treatment with colloidal silica at the treatment levels shown in the following Table II as Experiments A, B, C, D, E and F. These treatment levels ranged from 0 (control) to treatment levels of 2.5% in 0.5% increments. Experiment F, showing an average treatment level of 2.0%, was obtained by mixing a dry silica modified product of 3.1% treatment level with untreated clay in dispersed filter cake slurry formed via Cowles make-down.

Also shown in Table II is the make-down procedure employed, the BF viscosity, the Hercules viscosity and the Malvern Median particle size of the modified clays. The Hercules viscosity is a measurement of high shear viscosity and correlates to slurry pumpability. This is an important characteristic in paper mills in that the slurry must be pumpable by a high speed centrifugal pump. The Hercules viscosity, as determined under conditions using A-Bob at 1100 rpm, should provide a measurement of at least 18±500 rpm. A value below 18±400 rpm is not pumpable.

In Table II it will be noted that the control Experiment A had a Hercules viscosity reading of 18±170 rpm at a 74.5 solids concentration, and a reading of 18±490 rpm at a solids concentration of 73.5% Only the latter slurry is barely pumpable.

On the other hand, Experiments C, D, E and F all provide pumpable slurries at 74.5% solids because of the colloidal silica treatments. In Table II, make-down of the slurry products was at 75% solids.

A Hercules viscosity of at least 18±500 rpm is desired. Therefore the preferred colloidal silica treatment levels to provide this Hercules viscosity should be a minimum of about 1.0% by weight, and preferably about 1–1.5% by weight of colloidal silica, based on the amount of clay being treated.

Figure 2A:
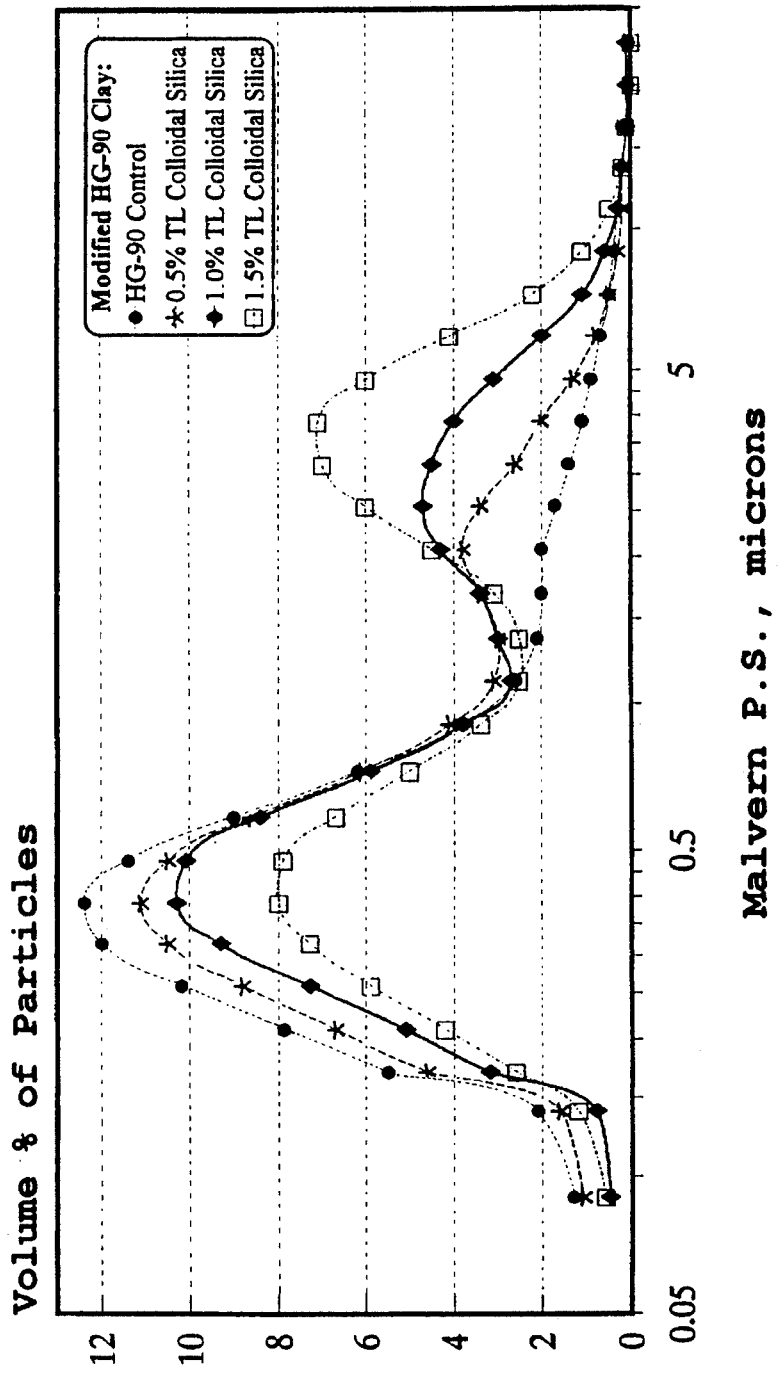
FIG. 2a is a graph illustrating the particle size histograms for a colloidal silica modified HG-90 clay pigment indicating the chemical structuring which occurs at low colloidal silica treatment levels.
Figure 2B:
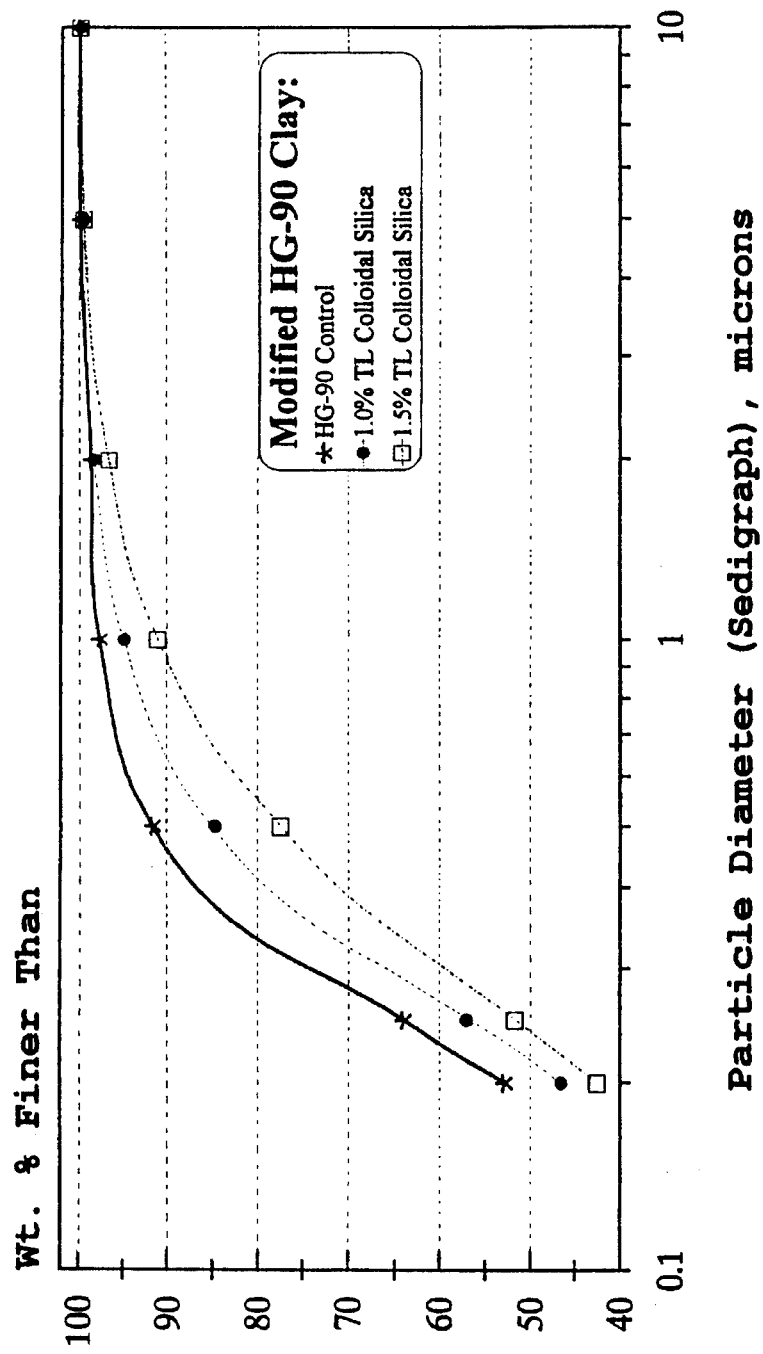
FIG. 2b is a sedigraph showing the chemical structuring of a colloidal silica modified HG-90 clay pigment when treated at low colloidal silica treatment levels.

FIGS. 2a, 2b and 2c are graphs demonstrating other properties associated with these silica modified HG-90 pigments, including: particle size Histograms in FIG. 2a; sedigraph particle size curves in FIG. 2b;, and bulking properties as measured by relative sediment density in FIG. 2c for products produced in accordance with the procedures of Table II except that the modified clays were all slurried at 50% solids. In FIG. 2a, the Malvern particle size Histograms show the results of chemical structuring provided by the low colloidal silica treatment levels of from 0.5–1.5% as compared with the Hydragloss 90 untreated control. FIG. 2b shows the sedigraph particle size curves for the indicated modified clays and the resulting degree of chemical structuring. The sedigraph curves are a plot of the particle diameter in microns against the weight percent of particles finer than the indicated amount in microns.

FIGS. 2a and 2b both show that most structuring occurs on the fine particles because they have the largest surface available for aggregation via reaction with the colloidal silica binder.

FIG. 2c is a plot of the treatment level of the colloidal silica against the relative sediment density of the products.

TABLE II

Hercules High-Shear Rheological Improvements for Modified Hydragloss ™ -90 Slurries of High Solids

| Expt. # | Colloidal Silica* TL active wt. % on dry clay | Malvern Median P.S. of Modified HG-90 (spray-dried Form), microns | Makedown Procedure Employed (Mkd. of 75.0% Solids Slurry) | BF Viscosity (20 rpm), cps @ Soild of: | | Hercules Visc.** (A-Bob/1100 rpm) dynes/@ rpm @ Solids of: | | Malvern Median P.S. of Modified HG-90 Slurry, microns |
|---|---|---|---|---|---|---|---|---|
| | | | | 74.5% | 73.5% | 74.5% | 73.5% | |
| A | 0.0 | 0.43 | HG-90(dry) + water | 1270 | 790 | 18+/170 | 18+/490 | 0.43 |
| B | 0.5 | 0.55 | Mod HG-90(dry) + water | 1400 | 1000 | 18+/360 | 18+/605 | 0.43 |
| C | 1.0 | 0.69 | Mod HG-90(dry) + water | 1700 | 1110 | 18+/450 | 2.3 | 0.43 |
| D | 1.5 | 2.78 | Mod HG-90(dry) + water | 1900 | 1360 | 18+/625 | 2.2 | 0.43 |
| E | 2.0 | 3.99 | Mod HG-90(dry) + water | 2200 | 1326 | 18+/720 | 2.2 | 0.46 |
| F | 3.1 (avg. of 2.0% on total clay blend) | 6.37 | Mod HG-90(dry) + std. HG-90 f.c. slurry | 2025 | — | 18+/555 | — | 0.52 |

Note:
*The colloidal silica reagent employed in this treatment and makedown study was Eka Nobel's Bindzil ™ 30/360 product (see Table I). TL = "Treatment Level" as active weight % basis on dry clay.
**Hercules Viscosity values indicated as being 18+[r]pm are off-scale readings.
The Malvern particle size unit is a laser light-scattering method. The particle size of spray-dried products is checked after being dispersed at about 6.5% solids via a Waring cup mixing procedure while the particle size of slurry products is checked "as is".
HG-90 = Hydragloss ™ -90 (a #1 high brightness, tertiary kaolin clay of very fine particle size). HG-90 f.c. = dispersed filter cake slurry of HG-90 (typically about 52% solids).

EXAMPLE 3

This example sets forth data and results from a pilot scale-up run of a colloidal silica modified Hydragloss 90 product. This work was basically a pilot plant scale-up based on the experiments of Example 2, specifically a scale-up of Example D of Table II in which the colloidal silica treatment was 1.5 wt. %. This product had optimum rheological benefits in terms of improved Hercules viscosity while maintaining the BF viscosity below 2000 cps. Physical property data are set forth in Table III-a.

As indicated in the NOTE following Table III-a, production of this modified Hydragloss 90 clay slurry was carried out on a 150 gallon batch slurry basis using a conventional 100 horsepower Cowles Dissolver makedown system operating at a tip speed of 4000 FPM.

The resulting slurry product from this experiment was compared with the starting Hydragloss 90 clay for the properties shown in Table III-a. It will be noted that the modified Hydragloss 90 clay has an increased BET surface area and an increased solids content.

In Table III-b, the coating performance of the basic Hydragloss 90 clay and the colloidal silica-modified Hydragloss 90 clay are compared in an LWC/Rotogravure application. The top portion of this table shows the coating ingredients. The bottom portion of this table shows the performance data for the coated paper sheets. In an LWC/Rotogravure application, the coating weight is normally in the range of 6–8 lbs. per ream per side. As shown in the performance data, the total coat weight used was 12 lbs. per ream. A major performance difference seen in the data of Table III-b is in the increase in the IGT value in centimeters per second from 81 cm/sec for the control to 127 cm/sec for the coated sheet containing colloidal silica modified clay. The IGT measurement is a measure of coating strength. The most expensive part of a paper coating formulation is the latex binder. The IGT value shows that the colloidal silica treated clay of this invention can potentially reduce the amount of latex binder needed to maintain coating strength properties and could therefore substantially reduce costs in paper production. An additional side benefit of being able to reduce latex binder levels in a coating formulation is added opacity, since less binder is available to fill air microvoids in the coating that provide significant light scattering properties. The performance relationship of binder level on coating opacity is well known to those skilled in the art.

It can be concluded from the results shown in Table III-b that the colloidal silica modified clay of this invention improves the coating strength of paper so as to represent a significant source of cost reduction via the removal of latex binder.

TABLE III-a

Pilot Scale-up of C.S. Modified Hydragloss-90 Product: Comparative Physical Properties Vs. HG-90

| Pigment Slurry Product: | A Hydragloss ™ -90 | B Modified Hydragloss-90 (w/1.5% active TL of Bindzil 30/360 colloidal silica)* |
|---|---|---|
| Specific Gravity (of dry pigment) | 2.60 | 2.59 |
| Malvern Med. P.S. of Spray-Dried Product, microns | 0.50 | 2.81 |
| BET Surface Area, m²/gm | 20.3 | 24.8 |
| Pigment Brightness, % | 91.4 | 91.3 |
| Initial Slurry Makedown Solids, % | 70+ | 75.0 |
| Final Adj. Slurry Solids, % | 70.1 | 74.4 |
| BF Viscosity (@ 20 rpm), cps | 250 | 1650 |
| Hercules Viscosity (A-Bob/1100 rpm), dynes | 1.6 | 18+/740 rpm |
| Malvern Med. P.S. of Final Slurry Product, microns | 0.50 | 0.50 |
| Slurry Residue, & +325 Mesh | 0.003 | 0.005 |
| Slurry pH (@ final % solids) | 6.8 | 6.9 |

Note:
*The pilot-scale production of this Modified HG-90 (Product D from Table II) was carried out on a 150 gallon batch slurry basis using a conventional 100 HP Cowles Dissolver makedown system operating at a tip speed of 4,000 fpm. The Malvern Median particle size of spray-dried products is checked after being dispersed at about 6.5% solids via a Waring cup mixing procedure while the particle size of slurry products is checked "as is".
Both slurry products were dispersed to minimum Brookfield Viscosity using a combination of soda ash and Colloids 211 sodium polyacrylate.

TABLE III-B

Comparative Coating Performance of HG-90 and C.S. Modified HG-90 Pigments in a LWC/Rotogravure Application Paper Coating Formulations (in active parts):

| | Coating I | Coating II |
|---|---|---|
| Coating Ingredients: | | |
| Hydraprint ™ (Std. Delaminated Clay) | 50 | 50 |
| Hydragloss ™ -90 (@ 70.1% slurry solids) | 50 | — |
| C.S. Modified Hydragloss-90 (Product Slurry B of Table III-a; @ 74.4% solids) | — | 50 |
| Polyacrylate Dispersant | 0.15 | 0.15 |
| SBR Latex (Dow 620) | 11 | 11 |
| Starch (Penford Gum 295) | 6 | 6 |
| Calcium Stearate (C-104) | 0.5 | 0.5 |
| Coating Properties: | | |
| Coating Solids, %; | 56.0 | 56.0 |
| Runnability of Coating | Control | Equal |

Coating Conditions:

- Total Coat Weight = 12 #/ream
- Basestock = 28 #/ream wood containing paper
- Coating Method = pilot coater operating at ~4,000 fpm
- Super Calendered Performance Data for Coated Sheets:

| Property*: | Coated Sheet I (Control) | Coated Sheet II |
|---|---|---|
| Coat Weight, #/ream | 12 | 12 |
| Opacity, % | 78.9 | 78.4 |
| Paper Gloss (F), % | 60.4 | 62.6 |

TABLE III-B-continued

Comparative Coating Performance of HG-90 and C.S.
Modified HG-90 Pigments in a LWC/Rotogravure
Application

| Printed Gloss (F), % | 85.8 | 87.1 |
|---|---|---|
| Brightness (F), % | 69.8 | 69.3 |
| Parker Print Surf (F) | | |
| @ 5 KGF | 2.59 | 2.46 |
| @ 10 KGF | 1.82 | 1.68 |
| @ 20 KGF | 1.23 | 1.15 |
| IGT, cm/sec. | 81 | 127 |

Note: *(F) denotes that property was measured on sheet's felt side.

EXAMPLE 4

In this example, Hydragloss 90 clay is treated with the colloidal silica reagents, Bindzil 30–360 and Bindzil 15–500 in Experiments A and B as shown in following Table IV. Experiment C is the control. The colloidal silica treatment level is 1.5% in both Experiments A and B and the initial make-down solids were all at 75%. The make-down temperature and slurry pH are also indicated.

The modified products were prepared by reaction of a Hydragloss 90 slurry at 55% solids with the colloidal silica reagent followed by spray drying to produce the dry colloidal silica modified Hydragloss 90 clay. The clay was then made down in water to provide the modified product slurry.

Table IV shows that the higher surface areas provided by the colloidal silica reagent of Experiment B do not improve results. The product of Experiment A using the colloidal silica Bindzil 30/360 appears to provide the maximum benefits with respect to Hercules viscosity.

30/360. The treatment levels are as indicated ranging from 0.6–1.8. In this case the clay was a Hydrafine™-90 ND, a non-delaminated Number 1 high brightness cretaceous kaolin clay. The slurry products were produced by reaction of the Hydrafine clay slurry at 55% solids with the colloidal silica reagent followed by spray drying to provide the dry colloidal silica modified clay. The clay was then made-down in water to produce the product. The data and results are shown in following Table V.

This example shows the difference in clay rheology using a different type of clay. In this case, the high anatase content of the non-delaminated clay appears to negate the benefits of colloidal silica treatment.

TABLE IV

Comparison of Slurry Viscosities for Hydragloss ™ Based Products
Surface Modified with Different Colloidal Silicas

| Expt. # | Colloidal Silica Reagent* | Colloidal Silica TL, active wt. % on clay | Initial Mkd. Solids, % | Mkd Temp, °C. | Slurry pH (@ 74.0% solids) | BF Visc. (20 rpm; @ 74.0% solids), cps | | Hercules Visc.** (A-Bob/1100 rpm; @ 74.0% solids), dynes/@ rpm | |
|---|---|---|---|---|---|---|---|---|---|
| | | | | | | Initial | +1 Week | Initial | +1 Week |
| A | Bindzil 30/360 | 1.5 | 75 | 45 | 6.8 | 2250 | 2550 | 18+/480 | 18+/480 |
| B | Bindzil 15/500 | 1.5 | 75 | 47 | 6.8 | 2250 | gelled | 18+/400 | gelled |
| C | none | 0.0 | 75 | 45 | 6.7 | 1500 | 1600 | 18+/200 | 18+/200 |

Note:
*The colloidal silica reagents employed in this comparative treatment study were Eka Nobel's Bindzil ™ 30/360 (a 360 m²/gm product) and Bindzil ™ 15/500 (a 500 m²/gm product). TL = "Treatment Level" as active weight % basis on dry clay.
**Hercules Viscosity values indicated as being 18+\rpm are off-scale readings.
Hydragloss ™ = a #1 Medium Brightness, Tertiary Kaolin Clay typically having a Malvern Median P.S. of about 1.0 micron. Modified slurry products (A & B) were produced by the following process scheme:

HG f.c. slurry + Collodial Silica $\xrightarrow{\text{spray dry}}$ "dry" Modified HG $\xrightarrow{\text{clay mkd. in H}_2\text{O}}$
(~55% solids)  Reagent Modified Product Slurry ⟵

EXAMPLE 5

In this example, Experiments A, B, C, D and E described in following Table V, are provided in which Example A is a control. The colloidal silica reagent employed was Bindzil

TABLE V

Hercules High-Shear Rheological Improvements for
Modified Hydrafine-90 ™ ND Slurries

| Expt. # | Colloidal Silica* TL, active wt. % on clay | Initial Mkd. Solids, % | Mkd. Temp, °C. | Slurry pH (@ 72.5% solids) | BF Visc. (20 rpm; @ 72.5% solids), cps | Hercules Visc.** (A-Bob/1100 rpm; @ 72.5% solids), dynes/@ rpm |
|---|---|---|---|---|---|---|
| A | 0.0 | 74.53 | 45 | 6.9 | 620 | 18+/545 |
| B | 0.6 | 74.52 | 45 | 6.6 | 740 | 18+/675 |
| C | 1.0 | 74.51 | 45 | 6.6 | 820 | 18+/815 |
| D | 1.4 | 74.54 | 45 | 6.7 | 900 | 18+/1030 |
| E | 1.8 | 74.51 | 46 | 6.8 | 940 | 18+/975 |

Note:
*The colloidal silica reagent employed in this treatment and makedown study was Eka Nobel's Bindzil ™ 30/360 product (see Table I). TL = "Treatment Level" as active weight % basis on dry clay.
**Hercules Viscosity values indicated as being 18+\rpm are off-scale readings.
Hydrafine-90 ™ ND = a non-delaminated, #1 High Brightness, Cretaceous Kaolin Clay. The above slurry products (B - E) were produced by the following process scheme:

HF-90 ND f.c. slurry + Collodial Silica $\xrightarrow[\text{dry}]{\text{spray}}$ "dry" Mod. HF-90 ND
(~55% solids)    Reagent Modified Product Slurry $\xleftarrow{\text{clay mkd. in } H_2O}$

EXAMPLE 6

In this example, a similar clay treatment to Example 5 was carried out using the colloidal silica treatment levels indicated. The clay used in this experiment was a delaminated kaolin clay product Hydramatte™, normally used for Matte paper applications. The delaminated clay was treated at 52% solids concentration with a dry Hydramatte™ clay which had been treated with 1% of colloidal silica, the colloidal silica being Bindzil 30/360. A delaminating clay normally provides print gloss properties. This Example shows that on a delaminated clay, the 1–2% colloidal silica treatment level provides optimum benefits for high shear rheology. The conditions and results are show in the following Table VI.

EXAMPLE 7

In this Example, comparisons are made in following Table VII between a Hydragloss 90 clay feed stock in Experiment A which has not been treated with colloidal silica with a composite pigment of the invention in Experiment B. The composite pigment in Experiment B is a Hydragloss 90 clay feed stock which has been treated with 4.0 wt. % of colloidal silica under the conditions described herein. The colloidal silica reagent employed was Ludox SM, described in Table I. The Hydragloss 90 clay was also treated simultaneously with 3.0% of titanium dioxide. The titanium dioxide used was an alumina-coated, rutile-based $TiO_2$ pigment slurry described in the NOTE to Table VII. The resulting compos-

TABLE VI

Comparison of Slurry Viscosities for Hydramatte ™ Based Products

| Expt. # | Additive* Used for Hydmt Rheology Adjustment | Hydmt/Pigment Blend Ratio (dry wt. basis) | Colloidal Silica** Level, active wt. % on blend | Initial Mkd. Solids, % | Malvern Med. P.S. of Product Slurry, microns | Final Slurry Solids, % | BF Viscosity (20 rpm; @ final solids), cps | Hercules Visc. (A-Bob/ 1100 rpm; @ final solids), dynes/@ rpm |
|---|---|---|---|---|---|---|---|---|
| 1 | none | 100/0 | 0.0 | 64.5 | 6.5 | 64.0 | 100 | 18+/200 |
| 2 | #2 clay (Hydrasperse ™) | 85/15 (Hydmt/Hydsp) | 0.0 | 64.5 | 6.2 | 64.0 | 295 | 18+/395 |
| 3-A | Modified-Hydmt (w/1.0% TL of colloidal silica) | 54/46 (Hydmt/M-Hydmt) | 0.46 | 68.1 | 6.5 | 66.3 | 188 | 18+/400 |
| 3-B | additional dilution water | — | — | — | — | 65.0 | 125 | 18+/810 |

Note:
Hydramatte ™ = a coarse particle size, fully delaminated Kaolin Clay product designed for Matte Paper applications. Hydramatte is abbreviated as Hydmt in the above table.
*Additive pigments included Hydrasperse ™ and a Modified-Hydramatte (abbreviated as Hydsp and M-Hydmt, respectively). Hydsp = a standard #2 coating clay. M-Hydmt = a Hydramatte pretreated with a 1.0% active TL of colloidal silica that is subsequently used in dry form to build slurry solids starting from standard Hydmt filter cake slurry (see process scheme below):

Hydmt f.c. slurry + dry M-Hydmt $\xrightarrow{\text{mkd}}$ ~68% Total Solids $\longrightarrow$ dilute as needed
(~52% solids)    (w/1% TL)    (54/46 pigment ratio)    for Herc. Visc.
**The colloidal silica reagent employed in this treatment and makedown study was Eka Nobel's Bindzil ™ 30/360 (see Table I).
The Malvern particle size unit is a laser light-scattering method. Slurry products were checked "as is".

ite pigment was 97% of colloidal silica modified clay and 3.0% of titanium dioxide. The titanium dioxide particles appear to act in the clay pigment as spacer particles. The composite pigment shown in Experiment B of Table VII is a colloidal silica modified clay which has a low titanium dioxide content.

The composite pigment was spray dried in accordance with procedures described herein and evaluated for physical properties. As shown in Table VII, the Malvern Median particle size of the spray dried product was 0.50 microns for the untreated Hydragloss 90 clay feed stock as compared to 6.04 microns for the composite pigment of Experiment B. Further, pigment brightness remains the same, the surface area is increased, and the slurry Ph is increased. This increase in Malvern Median particle size is dramatic and shows production of a superior composite structured pigment.

TABLE VII

Typical Properties for HG-90/TiO$_2$ Composite Pigment of Low Titanium Dioxide Content

| Pigment ID: | A<br>Hydragloss-90<br>(Clay Feedstock) | B<br>97/3 Composite Pigment* |
|---|---|---|
| Hydragloss ™ 90/TiO$_2$<br>Wt. Ratio (dry basis) | 100/0 | 97/3 |
| Colloidal Silica TL,<br>active wt. % on total pigment | 0.0 | 4.0 |
| Chemical Analysis: | | |
| TiO$_2$, % | 0.70 | 3.62 |
| Fe$_2$O$_3$, % | 0.93 | 0.79 |
| SiO$_2$, % | 45.31 | 46.15 |
| Al$_2$O$_3$, % | 39.46 | 36.99 |
| Na$_2$O, % | 0.19 | 0.26 |
| H$_2$O (% LOI)** | 13.90 | 12.88 |
| X-ray Diffraction | Kaolinite | Kaolinite + Rutile |
| Physical Properties: | | |
| Specific Gravity | 2.60 | 2.61 |
| Malvern Median P.S. of<br>Spray-Dried Product, microns | 0.50 | 6.04 |
| Pigment Brightness, % | 91.4 | 91.5 |
| BET Surface Area,<br>m$^2$/gm | 20.3 | 31.2 |
| Slurry pH (@ 28% solids) | 6.5 | 7.8 |

Note:
*The colloidal silica reagent employed herein was Ludox SM (see Table I). An alumina coated, rutile-based TiO$_2$ pigment slurry (Kemira's Unitane UDR-606) was used in producing pigment B.
**LOI = Lose on Ignition (@ 925° C.)
This % TiO$_2$ value (determined by XRF) is the sum of the natural anatase inherent to the kaolin clay plus the added rutile pigment content.
The Malvern Median particle size of spray-dried products is checked after being dispersed at about 6.5% solids via a Waring cup mixing procedure.

EXAMPLE 8

This Example prepares composite pigments having high titanium dioxide contents and compares those pigments with basic Hydragloss 90 clay and a blend of Hydragloss 90 clay and titanium dioxide. As may be noted from the following Table VIII-a, Experiment A sets forth the characteristics of the basic Hydragloss 90 clay feed stock. Experiment B sets forth the characteristics of a blend of Hydragloss 90 clay and titanium dioxide in which the clay has not been treated with colloidal silica.

Experiment C sets forth the characteristics of a composite pigment produced by blending 75 parts of a Hydragloss 90 clay which has been treated with 1.0% of colloidal silica and 25 wt. % of titanium dioxide in the same manner as in Example 7. Experiment D is a composite pigment of the invention in which the Hydragloss 90 clay has been treated with 1.5% of colloidal silica and the resulting composite treated with 25 wt. % of titanium dioxide.

Table VIII-a sets forth various characteristics, the important characteristics being the dramatic increase in Malvern Median particle size of the resulting spray dried product and the final slurry product of the composite pigments in Column C and D. Therefore, Table VIII-a demonstrates the advantages achieved by treating the colloidal silica modified clay with high amounts of titanium-dioxide.

Table VIII-a also sets forth the total pore volume for the products. The composite pigment of Experiment C is indicated as having a total pore volume of 0.854 ml/gm and the composite pigment of Experiment D has a total pore volume of 0.890 ml/gm.

The following Table VIII-b sets forth the pigment structure definitions based on mercury intrusion porosimetry as described in U.S. Pat. No. 5,186,746. From this Table it will be seen that the composite pigments of Experiments C and D of Table VIII-a are low structure pigments.

In treating the colloidal silica modified clay product with titanium dioxide, it has been found that the optimum amount of titanium dioxide is about 10–15% based on the total amount of silica modified clay. In the Examples, rutile titanium dioxide was used because of the higher refractive index. However, anatase titanium dioxide could also be used. It is also an advantage that rutile TiO$_2$ is available in slurry form, either untreated or surface modified. The surface modification of the titanium dioxide is application of low levels of alumina to provide better dispersion properties. The treated titanium dioxide provides better bonding composites. Low levels of alumina on the rutile titanium dioxide are preferred.

TABLE VIII-a

Comparative Physical Properties for "Low Structure" HG-90/TiO$_2$ Composite Pigments of High TiO$_2$ Content

| Pigment ID: | A<br>Hydragloss-90<br>(Clay Feedstock) | B<br>Clay/TiO$_2$<br>Physical Blend<br>(Control) | C<br>75/25<br>Composite Pigment* | D<br>75/25<br>Composite Pigment* |
|---|---|---|---|---|
| Hydragloss ™ -90/TiO$_2$ Wt. Ratio (dry basis) | 100/0 | 75/25 | 75/25 | 75/25 |
| Colloidal Silica TL,<br>active wt. % on total pigment | 0.0 | 0.0 | 1.0 | 1.5 |
| Specific Gravity<br>(of dry pigment) | 2.60 | 2.86 | 2.85 | 2.85 |

TABLE VIII-a-continued

Comparative Physical Properties for "Low Structure" HG-90/TiO₂
Composite Pigments of High TiO₂ Content

| Pigment ID: | A<br>Hydragloss-90<br>(Clay<br>Feedstock) | B<br>Clay/TiO₂<br>Physical Blend<br>(Control) | C<br>75/25<br>Composite<br>Pigment* | D<br>75/25<br>Composite<br>Pigment* |
|---|---|---|---|---|
| Malvern Med. P.S. of Spray-Dried Product, microns | 0.50 | 0.45 | 0.93 | 1.90 |
| Pigment Brightness, % | 91.4 | 93.7 | 93.7 | 93.7 |
| Initial Slurry Makedown Solids, % | 70+ | 72 | 65+ | 64+ |
| Final Adj. Slurry Solids, % | 70.1 | 71.8 | 65.4 | 64.0 |
| BF Viscosity (@ 20 rpm), cps | 250 | 520 | 655 (w/2.5 #/ton Acusol 820) | 615 (w/2.5 #/ton Acusol 820) |
| Hercules Viscosity (A-Bob/1100 rpm), dynes | 1.6 | 1.85 | 1.05 | 1.10 |
| Malvern Med. P.S. of Final slurry Product, microns | 0.50 | 0.45 | 0.88 | 1.52 |
| Total Pore Volume** (TPV), ml/gm | — | — | 0.854 | 0.890 |
| Differential Pore volume** (between dia. of 0.1–0.4 micron), ml/gm | — | — | 0.258 | 0.281 |
| Pore Max.**, dia. in microns | — | — | 0.14 | 0.14 |
| Slurry pH (@ final & solids) | 6.8 | 8.5 | 8.5 | 8.5 |

Note:
*The colloidal silica reagent employed herein was Ludox SM (see Table I). An alumina coated, rutile-based TiO₂ pigment slurry (Kemira's Unitane UDR-606) was used in producing these 75/25 composite pigments.
**Pore structure properties were measured via Mercury Intrusion Porosimetry (see Table VIII-b for pigment structure definitions.
The Malvern Median particle size of spray-dried products is checked after being dispersed at about 6.5% solids via a Waring cup mixing procedure while the particle size of slurry products is checked "as is".
The Brookfield Viscosity of both composite slurry products was adjusted upwards via the addition of Acusol ™ 820 polymer (an alkali swellable latex) to improve their pigment suspension properties.

TABLE VIII-b

Pigment Structure Definitions as Based on Mercury Intrusion Porosimetry*

| Pigment Structure Level: | Total Pore Volume (TPV), ml/gm |
|---|---|
| VHS (Very High Structure) | Above 3.3 |
| HS (High Structure) | 2.5–3.3 |
| MS (Medium Structure) | 1.6–2.5 |
| LS (Low Structure) | 0.8–1.6 |
| VLS (Very Low Structure) | Less than 0.8 |

Note:
*These pigment structure level definitions, as based on Mercury Intrusion Porosimetry criteria, were originally proposed in accordance with the teachings of U.S. Pat. No. 5,186,746 issued Feb. 16, 1993. Total Pore Volume (TPV) values were determined using a Micromeritics AutoPore-II 9220 unit. Pore volumes were determined over a Hg intrusion pressure range of 10.0–6,029 psia, wherein all the data was collected using an advancing contact angle of 130 degrees and a pressure equilibration time of 10 sec. per intrusion measurement point.

EXAMPLE 9

In this Example a comparison is made in the following Table IX between composite pigments of the invention based on different types of clay pigments. In Experiment A, the clay was Hydragloss 90; in Experiment B the clay was Hydrasperse 90 and in Experiment C, the clay was Hydrafine 90. The different clays are explained in the NOTE to Table IX. In each of Experiments A, B and C, the colloidal silica treatment was identical, the treatment amount being 1.8 wt. % based on the total clay pigment. The weight ratio of modified clay to titanium dioxide was 87.5–12.5 respectively. The modified titanium containing clay pigment of this invention was then blended in the ratios set forth with commercial sodium aluminosilicate product sold commercial as SAMS 5002, at a blending ratio of 90/10 for Experiment A, 88/12 for Experiment B, and 88/12 for Experiment C. The physical properties of the products of Experiments A, B and C are set forth in Table IX.

The results from Table IX show that the products of Experiments B and C have more structure and more structure in the optimum range. An important characteristic is the differential pore volume (DPV) and where the most beneficial pore volume will exist. The most beneficial pore volume is between 0.1 and 0.4 and all of these products fall within that range, being 0.3, 0.44 and 0.46 respectively.

Figure 4:
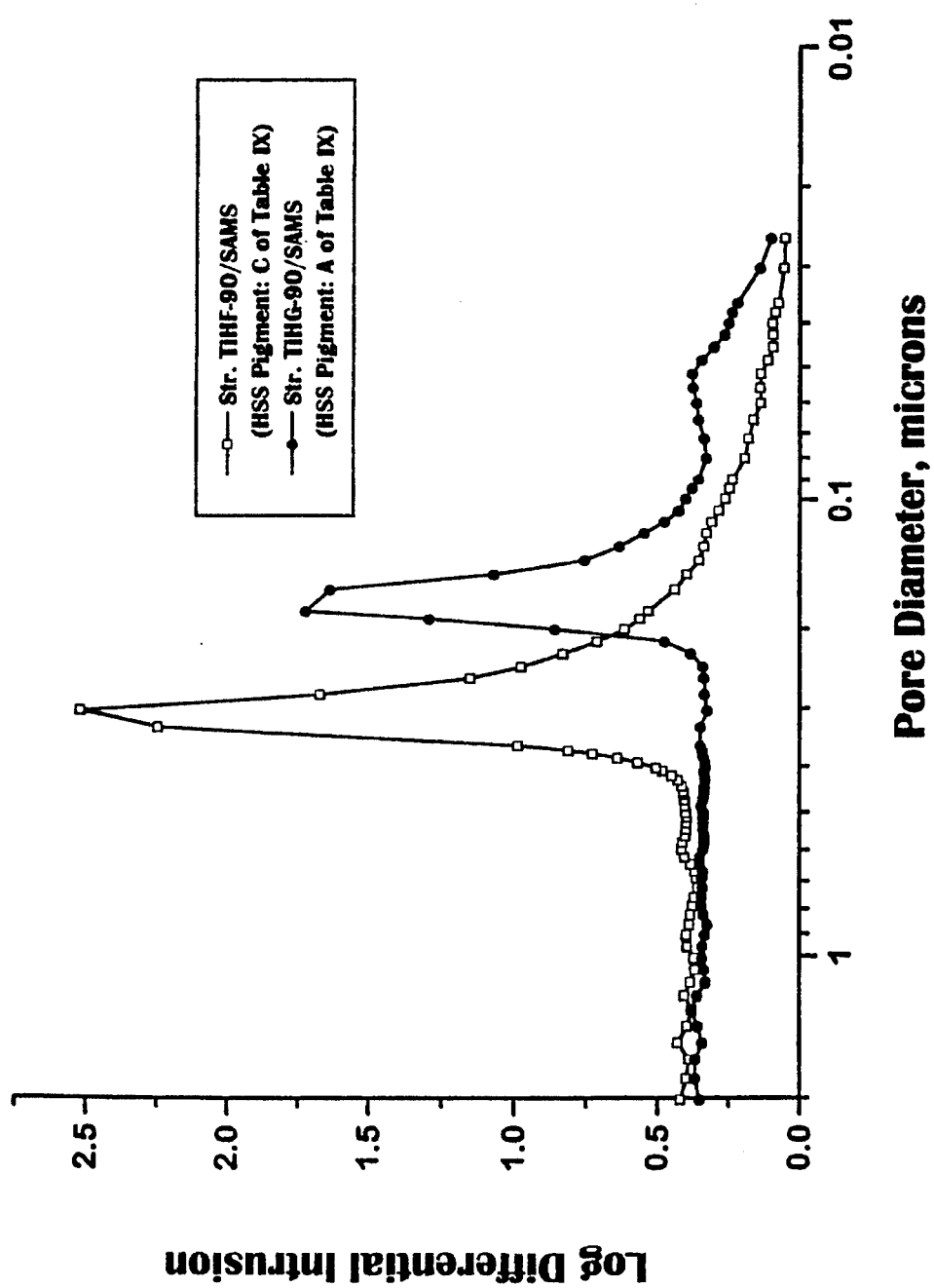
FIG. 4 is a graph showing the comparative pore structure of two different clay-titanium dioxide composite pigments.

Reference should be made to FIG. 3a with respect to porosity. Comparisons of the pore structure of a clay-titanium dioxide composite is made against a colloidal silica modified clay. Since porosity is on a gram or weight basis, this Figure becomes more significant because of the density differences in the product. In addition, FIG. 4 should be noted with respect to this Example as FIG. 4 shows the net effect of the clay particle size.

TABLE IX

Comparative Physical Properties for (Str. TiClay/SAMS) Pigment Slurries: HSS Products Produced from Different Clay Feedstocks

| Structured Pigment ID & Description | A | B | C |
|---|---|---|---|
| Str. TiClay Composition | HG-90 + Rutile $TiO_2$ + Colloidal Silica | Hydsp-90 + Rutile $TiO_2$ + Colloidal Silica | HF-90 DL+ Rutile $TiO_2$ + Colloidal Silica |
| Clay/$TiO_2$ Wt. Ratio (dry basis) | 87.5/12.5 | 87.5/12.5 | 87.5/12.5 |
| Colloidal Silica* TL, active wt. % on total pigment | 1.8 | 1.8 | 1.8 |
| Str. TiClay/SAMS-5002 Blend Ratio in Final Slurry Product | 90/10 | 88/12 | 88/12 |
| Physical Properties: | | | |
| Specific Gravity | 2.70 | 2.70 | 2.70 |
| Slurry Makedown Solids, % | 70.7 | 67.0 | 66.3 |
| Malvern Median P.S. of Slurry Product, microns | 2.93 | 2.11 | 2.14 |
| Brookfield Viscosity (@ 20 rpm), cps | 970 | 504 | 660 |
| Hercules Viscosity (A-Bob/1100 rpm), dynes | 11.8 | 18+/580 rpm | 18+/530 rpm |
| Pigment Brightness, % | 91.9 | 92.0 | 92.0 |
| Whiteness Index | 81.1 | 81.3 | 81.2 |
| Yellowness Index | 3.50 | 3.43 | 3.45 |
| BET Surface Area, $m^2/gm$ | 24.4 | 18.4 | 19.0 |
| Total Pore Volume (TPV), ml/gm | 0.94 | 1.05 | 1.13 |
| Differential Pore Volume (between dia. of 0.1–0.4 micron), ml/gm | 0.30 | 0.44 | 0.46 |
| Pore Max., dia. in microns | 0.18 | 0.33 | 0.33 |
| Slurry pH (@ final % solids) | 8.2 | 8.6 | |

Note: SAMS = sodium aluminosilicate product as per the teachings of U.S. Pat. No. 5,186,746 (1993). The HSS slurry products of this experiment were produced by combining SAMS-5002 filter cake slurry of 21% solids with dry Str. TiClay under Cowles makedown conditions (see FIG. 5 for process scheme with HF-90 DL).
*The colloidal silica reagent employed herein was Bindzil 30/360 (see Table I).
The feedstocks employed in this study were as follows: HG-90 = Hydragloss ™ 90 (0.50 micron Malvern Med. P.S.); Hydsp-90 = Hydrasperse ™ 90 (a high brightness #2 clay having a 2.00 micron Malvern Med. P.S.); HF-90 DL = Hydrafine ™ 90 DL (a high brightness #1, delaminated clay having a 1.90 micron Malvern Med. P.S); Rutile $TiO_2$ = Unitane UDR-606 (an alumina coated Rutile grade).

EXAMPLE 10

This Example sets forth the comparative performance of HSS (high structured silica) pigment slurries in a paper filler application. In following Table X-a, comparisons are made between the structured pigments A, B, C and D which are blends of structured clays which have been modified with colloidal silica and titanium dioxide and a SAMS 5002 commercial product. The SAMS 5002 product is a 50% solid slurry in Experiment D. The top part of this Table X-a shows the conditions for the tests.

The properties of the filled paper sheet are set forth at the bottom of Table X-a. Two different levels of filler were maintained, 6.0% and 13.0%. The opacity, brightness, whiteness index and yellowness index were generally the same for all of Experiments A, B and C. The yellowness index for pigments A, B and C was superior to the control of Example D at both filler levels. A significant property of Experiments A, B and C in this invention is found in the Scott Bond measurements, which measurements were substantially higher than the control Experiment D. Scott bond measures internal sheet strength and correlates the particle size. The results of this Table show that the product of Experiment C out performs the other pigments because of the superior optical properties.

Table X-b compares the coating performance of various high structured pigment slurries in paper coating formulations. The top part of this Table shows the pigments compared and the other components of the formulation. The bottom part of Table X-b shows the performance data. From this performance data Coating III appears superior in opacity, in paper gloss, brightness and the whiteness index.

TABLE X-a

Comparative Performance of HSS Structured Pigment Slurries in a Paper Filler Application Handsheet Parameters*:

| | | |
|---|---|---|
| Structured Pigments | A = | HSS Type Product (90/10 Blend Ratio of Str. TiHG-90/SAMS-5002) |
| | B = | HSS Type Product (88/12 Blend Ratio of Str. TiHydsp-90/SAMS-5002) |
| | C = | HSS Type Product (88/12 Blend Ratio of Str. TiHF-90/SAMS-5002) |
| | D = | Sampaque ™ 5002 (50% solids slurry) |
| Filler Levels | 6% and 13%, respectively | |
| Furnish | Bleached Furnish (604 Hardwood/40% Softwood) | |
| Freeness | 340 csf | |
| Basis Weight | 40 #/ream | |
| pH | To 4.5 with Alum | |
| Retention Aid | 0.5 #/ton Betz 713 | |
| Machine Calender | 2 Nips (weight of stpel roll only) | |

Note: *Handsheets were formed using TAPPI Method T205 om-88, revised 1988.
SAMS slurry product as described in U.S. Pat. No. 5,186,746 (1993). This structured clay product was included in this study

TABLE X-a-continued

Comparative Performance of HSS Structured Pigment Slurries in a Paper Filler Application as a comparative control.

Filled Sheet Properties**:

| Pigment | Filler Level, % | Opacity, % | Brightness, % | Whiteness Index | Yellowness Index | Scott Bond |
|---|---|---|---|---|---|---|
| A | 6.0 | 78.4 | 88.6 | 73.8 | 4.99 | 70 |
| B | 6.0 | 78.5 | 88.8 | 74.2 | 4.98 | 61 |
| C | 6.0 | 78.8 | 88.6 | 74.0 | 4.97 | 68 |
| D | 6.0 | 78.6 | 89.0 | 74.0 | 4.00 | 48 |
| A | 13.0 | 82.4 | 88.7 | 74.0 | 4.97 | 48 |
| B | 13.0 | 82.9 | 88.7 | 74.0 | 4.97 | 54 |
| C | 13.0 | 83.2 | 88.8 | 74.1 | 4.97 | 50 |
| D | 13.0 | 81.9 | 89.1 | 75.1 | 4.79 | 34 |

Note: **Values reported are at 95% confidence intervals as determined from replicated runs.

TABLE X-b

Comparative Coating Performance of Various HSS Pigment Slurries in a LWC Formulation Paper Coating Formulations (in active parts):

| | Coating I | Coating II | Coating III |
|---|---|---|---|
| Coating Ingredients: | | | |
| Hydraprint ™ (Std. Delaminated Clay) | 69 | 69 | 69 |
| Hydrafine ™ (Std. #1 Clay) | 17.5 | 17.5 | 17.5 |
| HSS Pigment A: (90/10 Ratio of Str. TiHG-90/ SAMS-5002) | 13.5 | — | — |
| HSS Pigment B: (88/12 Ratio of Str. TiHydsp-90/ SAMS-5002) | — | 13.5 | — |
| HSS Pigment C: (88/12 Ratio of Str. TiHF-90/ SAMS-5002) | — | — | 13.5 |
| Polyacrylate Dispersant | 0.15 | 0.15 | 0.15 |
| SBR Latex (Dow 620) | 8 | 8 | 8 |
| Starch (Penford Gum 295) | 8 | 8 | 8 |
| Calcium Stearate (C-104) | 0.5 | 0.5 | 0.5 |
| Coating Properties: | | | |
| Coating Solids, % | 61.6 | 61.6 | 61.6 |
| Brookfield Viscosity (20 rpm), cps | 5500 | 4800 | 4100 |
| Hercules Viscosity (E-Bob\4400 rpm), dynes | 10.0 | 9.7 | 9.2 |

Coating Conditions:

- Coat Weight = 6.0 #/ream
- Basestock = 30 #/ream (604 Mechanical/40% Kraft)
- Coating Method = "CLC" pilot coater operating at 2500 fpm

TABLE X-b-continued

Comparative Coating Performance of Various HSS Pigment Slurries in a LWC Formulation

- Super Calendered

Performance Data for Coated Sheets:

| Property: | Coated Sheet I | Coated Sheet II | Coated Sheet III |
|---|---|---|---|
| Opacity, % | 81.4 | 81.8 | 82.6 |
| Paper Gloss, % | 60.2 | 61.5 | 61.7 |
| Printed Gloss, % | 68.1 | 70.4 | 68.4 |
| Brightness, % | 69.7 | 69.7 | 70.1 |
| Whiteness Index | 43.1 | 43.1 | 43.6 |
| Yellowness Index | 11.1 | 11.0 | 11.0 |
| Parker Print Surf | | | |
| @ 5 KGF | 2.82 | 2.66 | 2.75 |
| @ 10 KGF | 2.16 | 2.13 | 2.17 |
| @ 20 KGF | 1.68 | 1.58 | 1.59 |

EXAMPLE 11

In this Example as shown in Table XI-a, an untreated Hydrafine™ clay feed stock in Experiment A was compared with a composite pigment of the invention in Experiment B. The composite pigment in Experiment B was a mixture of 87.5 parts by weight of a Hydrafine™ 90 clay pigment which had been modified by treatment with 1.8 wt. % of colloidal silica and 12.5 wt. % of titanium dioxide. The physical properties are set forth in the last few columns of the table. This Table shows that the composite pigment of the invention of Experiment B provides an improved brightness, an improved whiteness index, and surface area. Further, the Malvern Median particle size of the spray dried product was substantially increased as was the total pore volume. Therefore, the composite pigment of Experiment B is a significantly improved product as a paper coating pigment.

The following Table XI-b compares the product of Experiment B from Table X-a with the commercial product SAMPAQUE 5002 and the commercial product, Hycal, a fine particle size calcined clay. Table XI-b shows that the composite product of Experiment B is the product with improved characteristics.

Reference should be made to FIG. 6 accompanying this application with respect to the X-ray diffraction pattern of the three products of Table XI-b. The X-ray diffraction pattern of the product of Experiment B at the top of this FIG. 6 is clearly a distinct X-ray diffraction pattern from the reference patterns.

TABLE XI-a

Typical Chemical/Physical Properties for Structured TiHF-90 Composite Pigment

| Pigment ID: | A<br>Hydrafine ™ -90 DL<br>(Clay Feedstock) | B<br>87.5/12.5<br>Composite Pigment*<br>(i.e., Str. TiHF-90) |
|---|---|---|
| Hydrafine ™ -90 DL/TiO$_2$ Wt. Ratio (dry basis) | 100/0 | 87.5/12.5 |
| Colloidal Silica TL, active wt. % on total pigment | 0.0 | 1.8 |
| Chemical Analysis: | | |
| TiO$_2$, % | 1.01 | 12.66 |
| Fe$_2$O$_3$, % | 0.32 | 0.24 |
| SiO$_2$, % | 45.46 | 40.87 |
| Al$_2$O$_3$, % | 39.44 | 33.82 |
| Na$_2$O, % | 0.15 | 0.31 |
| H$_2$O (% LOI @ 925° C.) | 13.76 | 12.21 |
| X-ray Diffraction | Kaolinite | Kaolinite + Rutile |
| Physical Properties: | | |
| Specific Gravity | 2.60 | 2.72 |
| Malvern Median P.S. of Spray-Dried Product, microns | 2.10 | 4.0 |
| Malvern Specific Surface Area, m$^2$/gm | 2.65 | 1.54 |
| Pigment Brightness, % | 89.8 | 91.6 |
| Whiteness Index | 77.5 | 80.4 |
| Yellowness Index | 4.0 | 3.7 |
| Oil Absorption, gm/100 gm pigment | 40 | 40 |
| BET Surface Area, m$^2$/gm | 16.0 | 20.5 |
| Total Pore Volume** (TPV), ml/gm | — | 0.85 |
| Differential Pore Volume** (between dia. of 0.1–0.4 micron), ml/gm | — | 0.32 |
| Pore Max.**, dia. in microns | — | 0.33; 0.13(sh) |
| Slurry pH (@ 28% solids) | 6.8 | 8.0 |

Note:
*The colloidal silica reagent employed herein was Bindzil 30/360 (see Table I). An alumina coated, rutile-based TiO$_2$ pigment slurry (Kemira's Unitane UDR-606) was used in producing this structured composite pigment.
**Pore structure properties were measured via Mercury Intrusion Porosimetry. The (sh) designation indicates the presence of a significant shoulder on the pore size distribution curve.
This % TiO$_2$ value (determined by XRF) is the sum of the natural anatase inherent to the kaolin clay plus the added rutile pigment content. The Malvern Median particle size of spray-dried products is checked after being dispersed at about 6.5% solids via a Waring cup mixing procedure.

TABLE XI-b

Comparative Physical Properties for Structured Pigments Used in Producing HSC or HSS Slurry Products

| Pigment ID: | B<br>Str. TiHF-90<br>(87.5/12.5 Composite Pigment)* | C<br>Sampaque ™ -5002<br>(Spray-dried SAMS filter cake product) | D<br>Hycal ™<br>(Fine Particle Size Calcined Clay) |
|---|---|---|---|
| Structured Pigment Description | 87.5/12.5 Wt. Ratio of Hydrafine-90 DL/TiO$_2$ bonded with 1.8% TL of Colloidal Silica (Bindzil 30/360) | Chemically structured HG-90 produced via hydrothermal reaction with Sodium Silicate | Structured, amorphous aluminosilicate produced via calcination process |
| Chemical Analysis: | | | |
| TiO$_2$, % | 12.66** | 0.50 | 1.50 |
| H$_2$O (% LOI @ 925° C.) | 12.21 | 12.23 | 0.22 |
| X-ray Diffraction | Kaolinite + Rutile | Attenuated Kaolin | Amorphous |
| Physical Properties: | | | |
| Specific Gravity | 2.72 | 2.52 | 2.63 |
| Malvern Median P.S. of Spray-Dried Product, microns | 4.0 | 5.2 | 2.1 |
| Malvern Specific Surface Area, | 1.54 | 1.20 | 2.15 |

TABLE XI-b-continued

Comparative Physical Properties for Structured Pigments Used in Producing HSC or HSS Slurry Products

| Pigment ID: | B<br>Str. TiHF-90<br>(87.5/12.5 Composite<br>Pigment)* | C<br>Sampaque ™ -5002<br>(Spray-dried SAMS<br>filter cake product) | D<br>Hycal ™<br>(Fine Particle Size<br>Calcined Clay) |
|---|---|---|---|
| $m^2/gm$ | | | |
| Pigment Brightness, % | 91.6 | 92.2 | 93.0 |
| Whiteness Index | 80.4 | 81.5 | 82.9 |
| Yellowness Index | 3.7 | 3.4 | 3.2 |
| Oil Absorption, gm/100 gm pigment | 40 | 105 | 80 |
| BET Surface Area, $m^2/gm$ | 20.5 | 22.0 | 13.0 |
| Total Pore Volume (TPV), ml/gm | 0.85 | 2.85 | 1.60 |
| Differential Pore Volume (between dia. of 0.1–0.4 micron), ml/gm | 0.32 | 0.90 | 0.40 |
| Pore Max., dia. in microns | 0.33;0.13(sh) | 0.35 | 0.46 |
| Slurry pH (@ 28% solids) | 8.0 | 10.6 | 5.5 |

Note:
*An alumina coated, rutile-based $TiO_2$ pigment slurry (Kemira's Unitane UDR-606) was used in producing this structured composite pigment.
**This % $TiO_2$ value (determined by XRF) is the sum of the natural anatase inherent to the kaolin clay plus the added rutile pigment content.
pH value measured at 20% solids.
SAMS = sodium aluminosilicate product as per the teachings of U.S. Pat. No. 5,186,746 (1993).

EXAMPLE 12

The following Table XII sets forth comparative physical properties of various blends of the modified structured clay pigments of this invention with other clay products. The blends are important in the clay industry in providing an ability to tailor properties for particular end uses, especially for use as paper pigments. The blends set forth in Table XII are mixtures of high structured silica pigments of this invention with high structured clays known to the prior art. The high structured silica of this invention is a colloidal silica modified Hydrafine™-90 clay which is the pigment described in Experiment B of Table XI-a. The pigment in Experiment E of Table XII is an 88/12 by weight blend of the pigment of this invention with commercial product SAMS-5002. The pigment in Experiment F is an 88/12 by weight blend of the pigment of this invention with the commercial calcined clay, Hycal, sold by J. M. Huber Corporation. The pigment in Experiment G is a 75/25 blend of the pigment of this invention with the commercial product SAMS-5002, a structured paper pigment available from J. M. Huber Corporation. The pigment in Experiment H is 100% of the pigment of this invention and corresponds to the pigment of Experiment B of Table XI-b.

In the comparisons of Table XII, it will be noted that all the products have excellent Hercules viscosity and good optical properties. Thus, the high structured silica pigment of this invention, when blended with commercial clay pigments, provides excellent products to the paper industry wherein characteristics can be tailored for particular needs of the customer.

Figure 8:
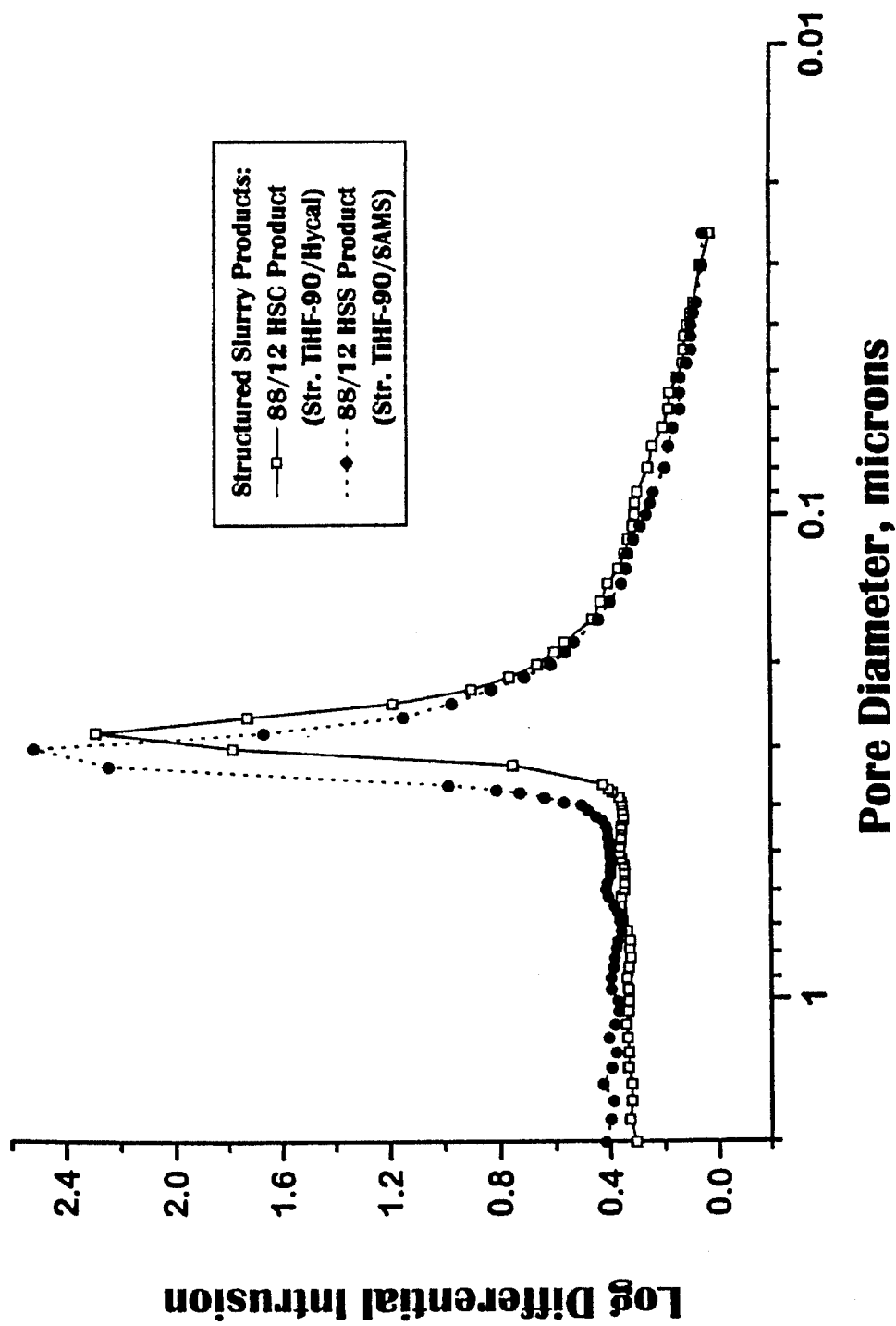
FIG. 8 is a graph showing the comparative pore structure of slurry product mixtures of this invention.

FIG. 7a, 7b and 8 are graphs showing the comparative pore structure of the pigment of this invention with Experiment F of Table XII in FIG. 7a and 7b and a comparison of the products of Experiments F and G of Table XII.

TABLE XII

Comparative Physical Properties of Various HSS and HSC Slurry Products

| Structured Pigment ID & Description | E<br>(88/12 HSS) | F<br>(88/12 HSC) | G<br>(75/25 HSS) | H<br>(Str. TiHF-90) |
|---|---|---|---|---|
| Str. TiHF-90/"Pigment" Blend Ratio in Final Slurry Product | 88/12<br>(Str. TiHF-90/<br>-5002 f.c.) | 88/12<br>(Str. TiHF-90/<br>Hycal) | 75/25<br>(Str. TiHF-90/<br>SAMS-5002) | 100/0<br>(100% Str.<br>TiHF-90) |
| Slurry Process Scheme (Also, see FIG. 5) | Mkd of TiHF-90 with 5002 f.c. slurry | Mkd of TiHF-90 & Hycal into water | Blending of Slurry H + SAMS-5002 slurry of 50% solids | Mkd of TiHF-90 pigment into water |
| Physical Prolperties: | | | | |
| Specific Gravity | 2.70 | 2.71 | 2.67 | 2.72 |
| Slurry solids, % | 65.8 | 66.2 | 62.5 | 69.0 |
| Malvern* Median P.S. of Slurry Product, microns | 2.72<br>450 | 2.42 | 2.18 | 2.45 |
| Brookfield viscosity (@ 20 rpm), cps | 460 | 280 | 1200 | 450 |
| Hercules Viscosity (A-Bob/1100 rpm), dynes | 18+/630 rpm | 18+/810 rpm | 18+/865 rpm | 16.5 |
| Pigment Brightness, | 91.9 | 91.9 | 92.0 | 91.8 |
| Whiteness Index | 81.4 | 80.7 | 80.8 | 80.2 |
| Yellowness Index | 3.44 | 3.67 | 3.64 | 3.78 |

TABLE XII-continued

Comparative Physical Properties of Various HSS and HSC Slurry Products

| Structured Pigment ID & Description | E (88/12 HSS) | F (88/12 HSC) | G (75/25 HSS) | H (Str. TiHF-90) |
|---|---|---|---|---|
| BET Surface Area, m²/gm | 21.3 | 18.9 | 20.8 | 20.5 |
| Slurry pH (@ final % solids) | 8.6 | 8.0 | 9.0 | 8.0 |

Note:
SAMS = sodium aluminosilicate product as per the teachings of U.S. Pat. No. 5,186,746 (1993). The solids content of SAMS-5002 filter cake slurry is typically about 21%.
*The Malvern Median particle size of these slurry products was checked "as is" without further dispersion.
All slurry makedowns were conducted on a 2 gallon batch size basis using a laboratory Cowles Dissolver unit. The Str. TiHF-90 used herein was Pigment B of Table XI-b.

EXAMPLE 13

This Example is a coating study comparing the performance of a high structure silica of this invention with high structured clay products in paper coating formulations. The comparisons as may be noted from the top part of following Table XIII, are between a delaminated clay, a Number 1 clay, and the commercial high structured product SAMPAQUE 5002, blends of products of E, F or G of Table XII, and the silica pigment of this invention which is Product H of Table XII. The performance data is set forth in the bottom part of Table XIII.

TABLE XIII

Comparative Performance of HSS and HSC Products in a LWC Formulation

Paper Coating Formulations (in active parts):

| | Coating I (Control) | Coatings II–IV | Coating V |
|---|---|---|---|
| Coating Ingredients: | | | |
| Hydraprint ™ (Std. Delaminated Clay) | 71 | 70 | 70 |
| Hydrafine ™ (Std. #1 Clay) | 18 | 15 | 15 |
| Titanium Dioxide (Rutile) | 3 | 1.5 | 1.5 |
| Sampaque ™ 5002 (50% solids slurry) | 8 | — | — |
| HSC or HSS Type Structured Blend (Test Product E, F, or G of Table XII) | — | 13.5 | — |
| Str. TiHF-90 Pigment Slurry (Test Product H of Table XII) | — | — | 13.5 |
| Polyacrylate Dispersant | 0.15 | 0.15 | 0.15 |
| SBR Latex (Dow 620) | 8 | 8 | 8 |
| Starch (Penford Gum 295) | 8 | 8 | 8 |
| Calcium Stearate (C-104) | 0.5 | 0.5 | 0.5 |
| Coating Properties: | | | |
| Coating Solids, % | 61.6 | 61.6 | 61.6 |

Coating Conditions:

- Coat Weight = 6.0 #/ream
- Basestock = 30 #/ream (60% Mechanical/40% Kraft)
- Coating Method = "CLC" pilot coater operating at 2500 fpm
- Super Calendered Performance Data for Coated Sheets:

| Coated Sheet & Pigment ID: | I (SAMS-5002) | II 88/12 HSS (TiHF-90/ SAMS-5002) | III 88/12 HSC (TiHF-90/ Hycal) | IV 75/25 HSS (TiHF-90/ SAMS-5002) | V Str. TiHF-90 Slurry |
|---|---|---|---|---|---|
| Property: | | | | | |
| Opacity, % | 83.0 | 83.0 | 82.9 | 83.1 | 82.3 |
| Paper Gloss, % | 55.9 | 56.3 | 59.4 | 59.6 | 59.2 |
| Printed Gloss, % | 63.6 | 62.7 | 62.6 | 63.3 | 60.8 |
| Brightness, % | 72.6 | 72.6 | 73.4 | 73.0 | 71.8 |
| Whiteness Index | 48.0 | 47.9 | 49.8 | 49.4 | 46.6 |
| Yellowness Index | 9.9 | 9.9 | 9.4 | 9.5 | 10.3 |

EXAMPLE 14

This Example presents a comparison of physical properties for higher structure analogs of the high structured silicas of this invention with blends with the calcined commercial clay, Hycal. The product in Experiment A is a Hydrafine™-90 delaminated clay which has been treated with 1.5 wt. % of the colloidal silica, Bindzil 30–360, and rutile titanium dioxide in an amount of 12.5 wt. %. The clay composition of Experiment B is the same composition wherein the clay treated with the colloidal silica and titanium dioxide is a mixture of the Hydrafine™-90 clay blended with 17 wt. % of the calcined clay, Hycal as shown in Table XIV. The product in Experiment C is an 80/20 blend of the pigment of Experiment A and Hycal. The pigment in Experiment D is a 96/4 blend of the pigment of Experiment B and Hycal.

The physical properties of these pigments of Experiments A, B, C and D are set forth in Table XIV.

SAMPAQUE-5002 product slurry. The product in Experiment A is a pigment slurry which is a blend of 88 parts of a structured pigment of this invention with 12 parts of the commercial calcined clay, Hycal. The pigment of Experiment B is the commercial high structured clay SAMPAQUE-5002 at a 50% solid slurry. The pigment of Experiment A utilizes the structured pigment of Experiment E of Table XII.

Table XV-a shows that the product of Experiment A provides a high solids pigment having higher opacity and higher Scott Bond.

Figure 9:
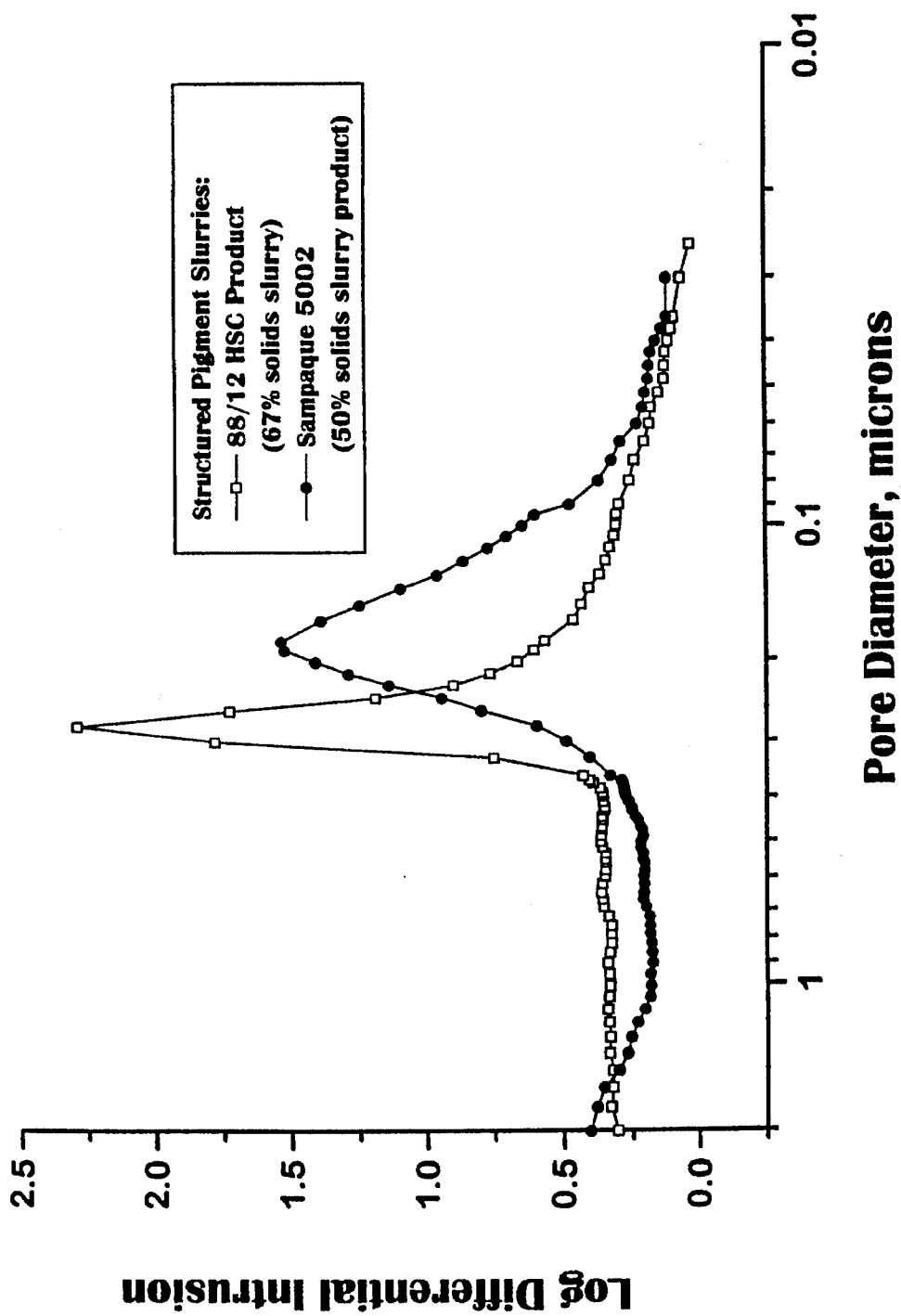
FIG. 9 is a graph of the comparative pore structure of a colloidal silica treated pigment mixture slurry of this invention compared with the commercial structured product SAMPAQUE 5002.

These pigments are further compared in Table XV-b for hand sheet parameters and filled sheet parameters. The comparative pore structure is shown in FIG. 9 for these two products.

TABLE XIV

Comparative Physical Properties for Higher Structure Analog of HSC

| Structured Pigment ID & Description | A | B | C | D |
|---|---|---|---|---|
| Str. TiClay Composition** | HF-90 DL + Rutile TiO$_2$ + Colloidal Silica | HF-90 DL + Hycal + Rutile TiO$_2$ + Colloidal Silica | — | — |
| Clay/calc. Clay/TiO$_2$ Wt. Ratios (dry basis) | 87.5/0/12.5 | 70.5/17/12.5 | — | — |
| Colloidal Silica* TL, active wt. % on total pigment | 1.5 | 1.5 | — | — |
| Str. TiClay/Hycal Blend Ratio in Final Slurry Product | — | — | 80/20 HSC Blend (Pigment A/Hycal) | 96/4 HSC Blend (Pigment B/Hycal) |
| Total Hycal Content in HSC Type Slurry Product, Wt. % | — | — | 20.0 | 20.0 |
| Physical Properties: | | | | |
| Specific Gravity | 2.72 | 2.72 | 2.70 | 2.71 |
| Malvern Median P.S. of Spray-Dried Product, microns | 3.5 | 3.9 | — | — |
| Malvern Median P.S. of Final Slurry Product, microns | — | — | 2.5 | 2.5 |
| BET Surface Area, m$^2$/gm | 20.0 | 18.0 | 18.8 | 17.8 |
| Total Pore Volume (TPV), ml/gm | 0.84 | 0.91 | 1.08 | 1.15 |
| Differential Pore Volume (between dia. of 0.1–0.4 micron). ml/gm | 0.32 | 0.41 | 0.46 | 0.56 |
| Pore Max., dia. in microns | 0.30 | 0.28 | 0.30 | 0.28 |
| Pigment Brightness, % | 91.6 | 91.9 | 92.0 | 92.0 |
| Slurry Makedown Solids, % | — | — | 65.2 | 67.2 |
| Brookfield Viscosity (@ 20 rpm), cps | — | — | 250 | 250 |
| Hercules Viscosity (A-Bob/1100 rpm), dynes | — | — | 18+/360 rpm | 18+/325 rpm |
| Slurry pH (@ final % solids) | — | — | 7.7 | 7.8 |

Note:
*The colloidal silica reagent employed herein was Bindzil 30/360 (see Table I).
**The clay, calcined clay and TiO$_2$ feedstocks employed in this study were as follows: HF-90 DL = Hydrafine ™ 90 DL (a high brightness, #1 delaminated clay; Malvern Med. P.S. was 2.0 microns); Hycal ™ (a high brightness, fine particle size calcined clay; Malvern Med. P.S. was 2.0 microns); Titanium Dioxide = Unitane UDR-606 (an alumina coated, rutile-based TiO$_2$ pigment).

EXAMPLE 15

In this Example, the following Table XV-a compares the physical properties for structured pigment slurries of high structured silica product of this invention with a commercial

TABLE XV-a

Comparative Physical Properties for Structured Pigment Slurries: HSC Vs. Sampaque-5002

| Pigment Slurry Product: | A<br>88/12 HSC Product<br>(Str. TiHF-90 + Hycal) | B<br>Sampaque ™ -5002<br>(SAMS Slurry Product<br>of ~50% Solids)* |
|---|---|---|
| Structured Pigment Description | 88/12 Mkd. Blend of TiHF-90/Hycal | 95/5 Slurry Blend of SAMS-5002/HG-90 |
| Specific Gravity (of dry pigments) | 2.71 | 2.52 |
| Initial Slurry Makedown Solids, % | 68 | 51 |
| Final Adj. Slurry Solids, % | 67.0 | 49.5 |
| Malvern Median P.S. of Slurry Product, microns | 2.70 | 0.95 |
| Malvern Specific surface Area, $m^2/gm$ | 1.81 | 3.60 |
| BF Viscosity (@ 20 rpm), cps | 275 | 600** |
| Hercules Viscosity (A-Bob/1100 rpm), dynes | 18+/600 rpm | 18+/500 rpm |
| Pigment Brightness, % | 91.9 | 92.0 |
| BET Surface Area, $m^2/gm$ | 20.0 | 23.0 |
| Total Pore Volume (TPV), ml/gm | 1.12 | 1.42 |
| Differential Pore Vol. (between dia. of 0.1–0.4 micron), ml/gm | 0.46 | 0.54 |
| Pore Max. dia. in microns | 0.28 | 0.17 |
| Slurry Residue, % +325 Mesh | 0.002 | 0.005 |
| Slurry pH (@ final % solids) | 7.8 | 10.8 |

Note:
*This SAMS slurry product was produced in accordance with the teachings of U.S. Pat. No. 5,186,746 (1993).
**The Brookfield Viscosity of this slurry product reflects the auxiliary addition of 6 #/ton Acusol 820 polymer (an alkali swellable latex) as a pigment suspension aide.
The Malvern Median particle size of these slurry products was checked "as is" without further dispersion.
See FIG. 9 for comparison of pore size distribution curves.

TABLE XV-b

Comparative Performance of Structured Clay Pigments in a Paper Filler Application

**Handsheet Parameters*:**

| Structured Pigments | A = | HSC Composite Pigment (67% solids slurry) |
|---|---|---|
|  | B = | Sampaque 5002 (50% solids slurry) |
| Filler Levels | 6.7% and 14.44, respectively | |
| Furnish | Bleached, Woodfree | |
| Freeness | 340 csf | |
| Basis Weight | 40 #/ream | |
| pH | To 5.0 with Alum | |
| Retention Aid | 0.5 #/ton Betz 713 | |
| Machine Calender | 2 Nips (weight of steel roll only) | |

Note:
*Handsheets were formed using TAPPI Method T205 om-88, revised 1988. The physical properties of structured pigments A and B are reported in Table XV-a.

Filled Sheet Properties:**

| Pigment | Filler Level, % | Opacity, % (0.6) | Brightness % (0.3) | Whiteness Index | Yellowness Index | Retention, % (6.0) | Scott Bond (1.2) |
|---|---|---|---|---|---|---|---|
| A | 6.7 | 77.2 | 88.9 | 75.1 | 4.71 | 65.8 | 64 |
| A | 14.4 | 81.7 | 89.2 | 75.1 | 4.77 | 72.5 | 51 |
| B | 6.7 | 76.8 | 88.8 | 75.0 | 4.71 | 66.8 | 47 |
| B | 14.4 | 80.3 | 89.2 | 75.5 | 4.67 | 73.2 | 35 |

Note: **Values reported are at 95% confidence intervals as determined from replicated runs.

EXAMPLE 16

This Example in Table XVI-a provides the comparative performance of high structured clays and calcined clay pigments in extending titanium dioxide in a LWC formulation. Coatings I, II, and III contain the coating ingredients indicated. Properties for the coated sheets are set forth at the bottom of the Table. This Table shows the effects of titanium dioxide extension and indicates that Coating III provides optimum extension and better results for IGT. Coating II results show extension of titanium dioxide.

The following Table XVI-b provides similar results for indicated Coatings I and II.

TABLE XVI-a

Comparative Performance of HSC and Calcined Clay Pigments in Extending TiO₂ in a LWC Formulation Paper Coating Formulations (in active parts):

| | Coating I | Coating II | Coating III |
|---|---|---|---|
| Coating Ingredients: | | | |
| Hydrasperse ™ (Std. #2 Clay) | 46.5 | 44.75 | 44.75 |
| Hydraprint ™ (Std. Delaminated Clay) | 46.5 | 44.75 | 44.75 |
| Titanium Dioxide (Rutile) | 7 | 3.5 | 3.5 |
| 88/12 HSC Product (Product Slurry A of Table XV-a) | — | 7 | — |
| Hycal ™ (a High Brightness, Fine P.S. Calcined Clay) | — | — | 7 |
| Polyacrylate Dispersant | 0.15 | 0.15 | 0.15 |
| Latex/Starch | 18 | 18 | 18 |
| Calcium Stearate (C-104) | 0.5 | 0.5 | 0.5 |
| Hercules Viscosity of Pigment Slip @ 68% Solids (A-Bob/1100 rpm), dynes | 8.0 | 8.0 | 18+/610 |
| Coating Properties: | | | |
| Coating Solids, % | 58.0 | 58.0 | 58.0 |
| Brookfield Viscosity (20 rpm), cps | 2250 | 2450 | 2600 |
| Hercules Viscosity (E-Bob/4400 rpm), dynes | 6.3 | 6.1 | 7.2 |
| Runnablity of Coating | Good | Good | Fair |

Coating Conditions:

- Total Coat Weight = 8.5 #/ream
- Basestock = 32 #/ream Woodfree paper
- Coating Method = pilot coater operating at ~4,000 fpm
- Super Calendered Performance Data for Coated Sheets:

| Property: | Coated Sheet I (Control) | Coated Sheet II | Coated Sheet III |
|---|---|---|---|
| Opacity, % | 90.2 | 90.0 | 90.2 |
| Paper Gloss, % | 49.4 | 49.1 | 49.4 |
| Printed Gloss, % | 79.1 | 77.0 | 74.6 |
| Brightness, % | 75.2 | 74.8 | 75.0 |
| Whiteness Index | 53.4 | 52.8 | 53.0 |
| Yellowness Index | 8.6 | 8.7 | 8.7 |
| IGT (cm/sec.) | 130 | 153 | 139 |
| Parker Print Surf | | | |
| @ 5 KGF | 2.58 | 2.64 | 2.63 |
| @ 10 KGF | 2.00 | 2.05 | 1.99 |
| @ 15 KGF | 1.46 | 1.50 | 1.49 |

TABLE XVI-B

Comparative Coating Performance of HSC and Calcined Clay Pigments in a LWC/Rotogravure Application Paper Coating Formulations (in active parts):

| | Coating I | Coating II |
|---|---|---|
| Coating Ingredients: | | |
| Hydrasperse ™ (Std. #2 Clay) | 45 | 45 |
| Hydraprint ™ (Std. Delaminated Clay) | 45 | 45 |
| Hycal ™ (Std. High Brightness, Fine P.S. Calcined Clay) | 10 | — |
| 88/12 HSC Product (Product Slurry A of Table XV-a) | — | 10 |
| Polyacrylate Dispersant | 0.15 | 0.15 |
| SBR Latex (Dow 620) | 11 | 11 |
| Starch (Penford Gum 295) | 6 | 6 |
| Calcium Stearate (C-104) | 0.5 | 0.5 |
| Coating Properties: | | |
| Coating Solids, % | 56.0 | 62.0 |
| Runnability of Coating | Control | Equal |

Coating Conditions:

- Total Coat Weight = 10 #/ream
- Basestock = 28 #/ream wood containing paper
- Coating Method = pilot coater operating at ~4,000 fpm
- Super Calendered Performance Data for Coated Sheets:

| Property*: | Coated Sheet I (Control) | Coated Sheet II |
|---|---|---|
| Coat Weight, #/ream | 10 | 10 |
| Opacity, % | 81.6 | 82.8 |
| Paper Gloss (F), % | 46.4 | 59.8 |
| Printed Gloss (F), % | 78.6 | 83.7 |
| Brightness (F), % | 71.1 | 71.9 |
| Parker Print Surf (F) | | |
| @ 5 KGF | 2.79 | 2.63 |
| @ 10 KGF | 2.01 | 1.79 |
| @ 20 KGF | 1.34 | 1.21 |

Note: *(F) denotes that property was measured on sheet's felt side.

EXAMPLE 17

This Example provides in Tables XVII-a and XVII-b typical physical properties of structured pigment blends designed for board coating applications. The Table compares the Hydragloss™-90 clay pigment slurry with a structured pigment blend of this invention which comprises 75% of the Hydragloss-90 clay with 25% of the 88/12 high structured clay product of this invention. Table XVII-b illustrates TiO₂ extension.

TABLE XVII-a

Typical Physical Properties of Structured Pigment Blend Designed for Board Coating Applications

| Pigment Slurry Product: | A Hydragloss ™ -90 | B Structured Pigment Blend* (75% Hydragloss ™ -90 + 25% 88/12 HSC Product) |
|---|---|---|
| Specific Gravity (of dry pigment) | 2.60 | 2.63 |
| BET Surface Area, m²/gm | 20.3 | 20.5 |
| Pigment Brightness, % | 91.4 | 91.6 |
| Slurry Solids, % | 70.1 | 69.4 |
| BF Viscosity (@ 20 rpm), cps | 250 | 260 |
| Hercules Visc., dynes | | |
| @ (A-Bob/1100 rpm) & | 1.6 | 1.6 |
| @ (B-Bob/4400 rpm) | 3.9 | 2.9 |
| Malvern Median P.S. of Slurry Product, microns | 0.50 | 2.20 |
| Malvern Specific | 4.972 | 2.130 |

TABLE XVII-a-continued

Typical Physical Properties of Structured Pigment Blend Designed for Board Coating Applications

| Pigment Slurry Product: | A Hydragloss ™ -90 | B Structured Pigment Blend* (75% Hydragloss ™ -90 + 25% 88/12 HSC Product) |
|---|---|---|
| Surface Area, $m^2$/gm | | |
| Slurry Residue, % +325 Mesh | 0.003 | 0.003 |
| Slurry pH (@ final % solids) | 6.8 | 7.3 |

Note:
*The pilot-scale production of this 75/25 ratio slurry product was carried out on a 250 gallon batch slurry basis by low-shear blending of the HG-90 and HSC slurries via a conventional Lightnin mixer unit (see FIG. 5 for detailed process scheme). The 88/12 HSC product slurry used herein is fully described in Table XV-a of Example 15.
The Malvern Median particle size of both slurry products was checked "as is" without further dispersion.

TABLE XVII-b

Performance of Structured Pigment Blend Containing HSC in a Board Coating Application: $TiO_2$ Extension Study Board Coating Formulations (in active parts):

| | Coating I (Control) | Coating II | Coating III |
|---|---|---|---|
| Coating Ingredients: | | | |
| Titanium Dioxide (Rutile) | 25 | 15 | 10 |
| Hydrafine ™ (Std. #1 Kaolin Clay) | 75 | — | — |
| 75/25 Structured Pigment Blend (Product Slurry B of Table XVII-a) | — | 85 | 90 |
| Polyacrylate Dispersant | 0.15 | 0.15 | 0.15 |
| SB Latex | 17 | 17 | 17 |
| Protein | 4 | 4 | 4 |
| Coating Properties: | | | |
| Coating Solids, % | 46.0 | 46.0 | 46.0 |
| Brookfield Viscosity (20 rpm), cps | 640 | 1250 | 1100 |

Coating Conditions:

Coat Weight = 5.6 #/1000 ft.$^2$
Coating Method = Laboratory Air Knife operating at 100 fpm
Board Stock = Unbleached Kraft
Machine Calendered @ 300 pli, 80° F. heat Performance Data for Coated Boards:

| Property: | Coated Board I (Control) | Coated Board II | Coated Board III |
|---|---|---|---|
| Gloss, % | 21.8 | 34.2 | 32.0 |
| Printed Gloss, % | 57.2 | 62.3 | 61.4 |
| Brightness, % | 69.1 | 74.4 | 69.0 |
| Whiteness Index | 66.5 | 75.6 | 68.9 |
| Yellowness Index | 0.98 | −0.82 | −0.23 |
| IGT, cm/sec. (medium oil) | >180 | >180 | >180 |
| Parker Print Surf | | | |
| @ 5 KGF | 6.15 | 5.69 | 5.43 |
| @ 10 KGF | 4.67 | 4.24 | 4.15 |
| @ 20 KGF | 3.52 | 3.20 | 3.14 |
| K & N | 85.1 | 89.2 | 91.0 |
| Gluing* | 5 | 5 | 5 |

Note: *Gluing was measured based on Fiber Tear (0–5 scale) with 0 = no fiber tear and 5 = complete fiber tear.

TABLE XVII-c

Comparative Performance of HSC and Calcined Clay As Components of a Structured Pigment Blend: Board Coating Application Board Coating Formulations (in active parts):

| | Coating I | Coating II |
|---|---|---|
| Coating Ingredients: | | |
| Titanium Dioxide (Rutile) | 15 | 15 |
| 75/25 Structured Pigment Blend (Product Slurry B of Table XVII-a) | 85 | — |
| Control Blend of 754 Hydragloss ™ -90 + 25% Hycal ™ Calcined Clay* | — | 85 |
| Polyacrylate Dispersant | 0.15 | 0.15 |
| SB Latex & Protein | 21 | 25 |
| Coating Solids, % | 46.0 | 46.0 |

Coating Conditions:

- Coat Weight = 5.6 #/1000 ft.$^2$
- Coating Method = Laboratory Air Knife operating at 100 fpm
- Board Stock = Unbleached Kraft
- Machine Calendered @ 300 pli, 80° F. heat Performance Data for Coated Boards:

| Property: | Coated Board I | Coated Board II |
|---|---|---|
| Gloss, % | 34.2 | 32.4 |
| Printed Gloss, % | 62.3 | 61.2 |
| Brightness, % | 74.4 | 72.7 |
| Whiteness Index | 75.6 | 73.5 |
| Yellowness Index | −0.82 | −0.65 |
| IGT, cm/sec. (medium oil) | >180 | 140 |
| Parker Print Surf | | |
| @ 5 KGF | 5.69 | 5.90 |
| @ 10 KGF | 4.24 | 4.49 |
| @ 20 KGF | 3.20 | 3.35 |
| K & N | 89.2 | 90.0 |
| Gluing** | 5 | 5 |

Note:
*Hycal ™ = a high brightness, fine particle size calcined clay. The 75/25 control slurry was prepared by blending finished Hydragloss ™ -90 slurry (@ 70% solids) and a Hycal slurry (@ 50% solids) thereby yielding a final blend product of 63.6% solids.
**Gluing was measured based on Fiber Tear (0–5 scale) with 0 = no fiber tear and 5 = complete fiber tear.

EXAMPLE 18

This Example provides in Table XVIII comparative properties of various clay slurries made-down in combination with various structured pigment.

TABLE XVIII

Comparative Properties of Hydrous Clay Slurries Madedown in Combination with Various Structured Pigments

| Test No. #& Slurry Product* Description | Clay/Str. Pigment Ratio | Slurry P.S. (Malv. Med.), microns | Pore Structure Properties**: TPV, ml/gm | DPV, ml/gm | Pore Max, dia. in microns | BET S.A. $m^2$/gm | Brightness, % | Whiteness Index | Viscosity Properties***: % Solids | BF, cps | Herc., dynes/@ rpm |
|---|---|---|---|---|---|---|---|---|---|---|---|
| A) HF Control | 100/0 | 1.51 | — | — | — | 17.5 | 87.3 | 70.6 | 70.0 | 215 | 6.4 |
| B) HF/Hycal | 85/15 | 1.63 | 1.114 | 0.406 | 0.26 | 16.9 | 88.0 | 72.2 | 67.9 | 185 | 18+/520 |
| C) HF/SAMS-5002 | 85/15 | 2.22 | 1.139 | 0.461 | 0.26 | 18.8 | 88.0 | 73.1 | 66.8 | 360 | 18+/410 |
| D) HF/Str TiHF-90 | 85/15 | 2.42 | 1.051 | 0.395 | 0.23 | 17.5 | 88.1 | 72.5 | 70.6 | 275 | 18+/1080 |
| E) HF/Str TiHF-90 | 75/25 | 2.48 | 1.197 | 0.400 | 0.23 | 17.6 | 88.7 | 73.5 | 70.4 | 275 | 17.7 |
| F) HF/Str TiHF-90 | 50/50 | 2.47 | 1.071 | 0.403 | 0.24 | 18.0 | 89.8 | 75.9 | 70.2 | 700 | 18+/700 |
| G) Hydsp Control | 100/0 | 2.30 | — | — | — | 16.4 | 86.9 | 69.3 | 70.4 | 212 | 9.7 |
| H) Hydsp/Hycal | 85/15 | 2.26 | 1.118 | 0.463 | 0.30 | 15.9 | 87.6 | 71.3 | 68.0 | 205 | 18+/410 |
| I) Hydsp/SAMS-5002 | 85/15 | 2.62 | 1.158 | 0.466 | 0.30 | 17.8 | 87.6 | 71.3 | 66.1 | 285 | 18+/420 |
| J) Hydsp/Str TiHF-90 | 85/15 | 2.84 | 1.1073 | 0.436 | 0.26; 0.18 | 16.5 | 87.8 | 71.5 | 70.9 | 285 | 18+/910 |
| K) Hydpt Control | 100/0 | 4.25 | — | — | — | 13.5 | 87.3 | 71.3 | 69.2 | 245 | 18+/515 |
| L) Hydpt/Hycal | 85/15 | 3.83 | 1.208 | 0.407 | 0.39 | 14.1 | 88.3 | 73.7 | 64.6 | 160 | 18+/430 |
| M) Hydpt/SAMS-5002 | 85/15 | 4.07 | 1.248 | 0.412 | 0.41 | 15.7 | 88.1 | 73.4 | 62.4 | 135 | 18+/410 |
| N) Hydpt/Str TiHF-90 | 85/15 | 4.15 | 1.1103 | 0.405 | 0.38 | 14.5 | 88.3 | 73.7 | 69.9 | 305 | 18+/425 |

Note:
*The clay-based products used herein are produced by the J. M. Huber corporation and are described below: HF = Hydrafine ™ (a #1, medium brightness coating grade kaolin clay); Hydsp = Hydraperse ™ (a standard #2, coating grade kaolin clay); Hydpt = Hydraprint ™ (a standard delaminated, coating grade kaolin clay); Hycal™ = (a fine particle size, high brightness calcined kaolin clay); SAMS-5002 = Sampaque ™ 5002 (a high brightness, chemically structured kaolin clay produced via hydrothermal means as per U.S. Pat. No. 5,186,746); Str. TiHF-90 = (structured composite pigment as previously described in Table XI-a of Example 11).
**Pore Structure Properties were measured via Mercury Intrusion Porosimetry.
***Viscosity Measurements were made at 25° C.: BF = Brookfield Viscosity (@ 20 rpm); Herc. = Hercules Viscosity (A-Bob/1100 rpm) whereby off-scale readings are expressed as 18+/rpm.

EXAMPLE 19

This Example provides in following Tables XIX-a, XIX-b, XIX-c and XIX-d data on comparative slurry properties of various delaminated clay/structured pigment combinations.

TABLE XIX-a

Comparative Slurry Properties of Various Hydramatte/Structured-Pigment Combinations

| Test No. # & Slurry Product Description* | Clay/Str. Pigment Ratio | Initial Mkd. Solids**, % | Slurry P.S. (Malv. Med.), microns | Final Adj. Solids, % | Viscosity Properties***: BF Visc. (@ 20 rpm), cps | Herc. Visc., dynes/@ rpm |
|---|---|---|---|---|---|---|
| A) Hydmt/Hycal | 80/20 | 64 | 5.38 | 61.5 | 60 | 18+/355 |
|  |  |  |  |  | 375 (w/CMC) | 18+/275 (w/CMC) |
| B) Hydmt/Hycal | 60/40 | 61.5 | 4.48 | 59.1 | 47 | 18+/365 |
|  |  |  |  |  | 390 (w/CMC) | 18+/285 (w/CMC) |
| C) Hydmt/Str. TiHF-90 | 60/40 | 65+ | 5.29 | 65.2 | 155 | 16.2 |
|  |  |  |  |  | 380 (w/CMC) | 18+/830 (w/CMC) |
| D) Hydmt/Str. TiHF-90 | 50/50 | 69+ | 5.05 | 69.2 | 375 | 18+/580 |

Note:
*The clay-based product used herein are described below: Hydmt = Hydramatte ™ (a coarse particle size, fully delaminated kaolin clay product used for coating applications); Hycal ™ = (a fine particle size, high brightness calcined kaolin clay); Str. TiHF-90 = (structured composite pigment consisting of Hydrafine ™ -90 DL, TiO$_2$ and Colloidal Silica as previously described in Example 11).
**Experimental test slurries employing the Str. TiHF-90 were prepared as follows:

TABLE XIX-a-continued

Comparative Slurry Properties of Various Hydramatte/Structured-Pigment Combinations

| Test No. # & Slurry Product Description* | Clay/Str. Pigment Ratio | Initial Mkd. Solids**, % | Slurry P.S. (Malv. Med.), microns | Final Adj. Solids, % | Viscosity Properties***: BF Visc. (@ 20 rpm), cps | Herc. Visc., dynes/@ rpm |
|---|---|---|---|---|---|---|
| Hydmt f.c. slurry + "dry" Str. TiHF-90 —Cowles/makedown→ 60/40 Ratio Pigment Slurry (@ ~53% solids) (@ 65–66% solids) or 50/50 Ratio Pigment Slurry (@ 69–70% solids) | | | | | | |

***Viscosity Measurements made at 25° C.: BF Visc. = Brookfield Viscosity; Herc. Visc. = Hercules Viscosity (A-Bob/1100 rpm) whereby off-scale readings are expressed as 18+/rpm. In the case of structured slurry products A–C, their very low Brookfield Viscosities necessitated the addition of some CMC polymer as a pigment suspension aide (e.g., approximately 1.0 lb./ton of Aqualon's Aqua-D fluidized CMC polymer was added to bring the final Brookfield values to about 400 cps).

TABLE XIX-b

Comparative Physical Properties of Various Delaminated Clay Based Products

| Pigment Slurry Product: | E Hydraprint ™ | F Hydramatte ™ | C 60/40 Blend of Hydmt/ Str. TiHF-90 (C of Table XIX-a) |
|---|---|---|---|
| Specific Gravity (of dry pigment) | 2.60 | 2.60 | 2.65 |
| BET Surface Area, m²/gm | 13.5 | 12.9 | 16.0 |
| Total Pore Volume* (TPV), ml/gm | — | — | 1.055 |
| Differential Pore Volume* (between dia. of 0.1–0.4 micron), ml/gm | — | — | 0.320 |
| Pigment Brightness, % | 87.3 | 87.3 | 89.6 |
| Whiteness Index | 71.3 | 72.3 | 76.4 |
| Initial Slurry Makedown Solids, % | 69+ | 64+ | 65+ |
| Final Adj. Slurry Solids, % | 69.2 | 64.0 | 65.2 |
| BF Viscosity (@ 20 rpm), cps | 245 | 120 | 155 |
| Hercules Viscosity (A-Bob/1100 rpm), dynes | 18+/515 | 18+/220 | 16.2 |
| Malvern Med. P.S. of Final Slurry Product, microns | 4.25 | 6.30 | 5.29 |
| Slurry Residue, % +325 Mesh | 0.001 | 0.001 | 0.002 |
| Slurry pH (@ final % solids) | 6.8 | 6.8 | 6.9 |

Note:
*Pore Structure Properties were measured via Mercury Intrusion Porosimetry.
The Malvern Median particle size of these slurry products was checked "as is" without further dispersion.
All the slurry products were dispersed to minimum Brookfield Viscosity using a combination of soda ash and Colloids 211 sodium polyacrylate.

TABLE XIX-c

Performance of Hydramatte/Str. TiHF-90 Pigment Slurries in a LWC/Offset Coating Application Paper Coating Formulations (in active parts):

| | Coating I | Coating II | Coating III |
|---|---|---|---|
| Coating Ingredients: | | | |
| Hydraprint ™ (Std. Delaminated Clay) | 100 | — | — |
| Hydmt/Str. TiHF-90 @ 60/40 Ratio (Product Slurry C of Table XIX-a) | — | 100 | — |
| Hydmt/Str. TiHF-90 @ 50/50 Ratio (Product Slurry D of Table XIX-a) | — | — | 100 |
| Polyacrylate Dispersant | 0.15 | 0.15 | 0.15 |
| SBR Latex (Dow 620) | 9 | 9 | 9 |
| Starch (Penford Gum 295) | 8 | 8 | 8 |
| Calcium Stearate (C-104) | 0.5 | 0.5 | 0.5 |
| Sunrez | 0.36 | 0.36 | 0.36 |
| Coating Properties: | | | |
| Coating Solids, % | 52.0 | 52.0 | 52.0 |
| Coating pH | 6.5 | 6.6 | 6.7 |
| Brookfield Viscosity (20 rpm), cps | 540 | 820 | 700 |
| Hercules Viscosity (E-Bob/4400 rpm), dynes | 3.1 | 3.4 | 2.8 |

Coating Conditions:

- Coat Weight = 3.5 or 3.0 #/ream on one side only (see below)
- Basestock = 24 #/ream wood containing paper
- Coating Method = "CLC" pilot coater operating at 2500 fpm
- Super Calendered - 2 nips @ 1250 pli, 170° F. heat Performance Data for Coated Sheets (Part I):

| Property: | Coated Sheet I (Control) | Coated Sheet IIa | Coated Sheet IIIa |
|---|---|---|---|
| Coat Weight, #/ream | 3.5 | 3.0 | 3.0 |
| Opacity, % | 78.6 | 79.1 | 80.1 |
| Paper Gloss, % | 42.2 | 38.4 | 40.0 |
| Printed Gloss, % | 70.3 | 66.6 | 66.7 |
| Brightness, % | 68.7 | 70.8 | 71.4 |
| Whiteness Index | 40.4 | 45.3 | 46.6 |
| Parker Print Surf | | | |
| @ 5 KGF | 3.03 | 3.15 | 3.18 |
| @ 10 KGF | 2.49 | 2.57 | 2.58 |
| @ 20 KGF | 1.95 | 2.01 | 2.12 |

TABLE XIX-d

Performance of Hydramatte/Str. TiHF-90 Pigment Slurries in a LWC/Offset Coating Application (Part II of Study)

Alternate Coating Conditions:

Same coating conditions as in TABLE XIX-c above except: Super Calendered the Sheets to approx. equal opacity and then re-determined their properties (see below).

Performance Data for Coated Sheets (Part II):

| Property: | Coated Sheet I (Control) | Coated Sheet IIb | Coated Sheet IIIb |
|---|---|---|---|
| Coat Weight, #/ream | 3.5 | 3.0 | 3.0 |
| Opacity, % | 78.6 | 78.9 | 79.5 |
| Paper Gloss, % | 42.2 | 45.4 | 44.9 |
| Printed Gloss, % | 70.3 | 72.4 | 71.3 |
| Brightness, % | 68.7 | 69.9 | 70.3 |
| Whiteness Index | 40.4 | 41.9 | 43.7 |
| Parker Print Surf | | | |
| @ 5 KGF | 3.03 | 2.97 | 2.97 |
| @ 10 KGF | 2.49 | 2.34 | 2.39 |
| @ 20 KGF | 1.95 | 1.89 | 1.89 |

EXAMPLE 20

This example sets forth coating performance data for a Hydramatte™/structured clay pigment blend of this invention in a latex flat paint application. A comparison of Formulations A and C show significant advantages in Formulation C. Formulation C utilizes the high structured silica pigment of this invention.

TABLE XX

Coating Performance of Hydramatte/Str. TiHF-90 Pigment Blend In an Interior, Latex Flat Paint Application I) Interior Latex Flat Formulation (lb. per 100 gallon):

| Pre-Blend Master Batch: (Ingredients) | A PolyPlate P (Std. Delaminated Clay) | B Optiwhite (Flash-Calcined Clay) | C Hydmt/Str. TiHF-90 Blend @ 60/40 (−5% TiO$_2$ in Formulation) |
|---|---|---|---|
| Water | 184.36 | 184.36 | 184.36 |
| Ethylene Glycol | 27.75 | 27.75 | 27.75 |
| Texanol | 11.85 | 11.85 | 11.85 |
| Colloid 643 | 1.00 | 1.00 | 1.00 |
| Natrosol 430 Plus | 3.50 | 3.50 | 3.50 |

TABLE XX-continued

Coating Performance of Hydramatte/Str. TiHF-90 Pigment Bland
In an Interior, Latex Flat Paint Application

| | | | |
|---|---|---|---|
| Nuosept 95 | 1.19 | 1.19 | 1.19 |
| Colloid 226 - 35% | 4.28 | 4.28 | 4.28 |
| AMP-95 | 2.00 | 2.00 | 2.00 |
| TiO$_2$ (TiPure R-942) | 193.49 | 193.49 | 193.49 |
| Attagel 50 | 5.00 | 5.00 | 5.00 |
| Triton X-100 | 1.05 | 1.05 | 1.05 |
| Celite 281 | 32.00 | 32.00 | 32.00 |
| Camel-Tex | 173.51 | 173.51 | 173.51 |
| Pigment Grind Components*: | | | |
| PolyPlate P (slurry @ 68.06% solids) | 193.94 | — | — |
| Optiwhite (dry) | — | 111.71 | — |
| 60% Hydmt/40% Str. TiHF-90 (slurry @ 65% solids)** | — | — | 219.86 |
| TiO$_2$ (TiPure R-942) | 10.18 | 10.18 | — |
| Water | 25.92 | 87.84 | — |
| Letdown Components: | | | |
| Acrysol TT-935 | 1.85 | 1.85 | 1.85 |
| Latex (UCAR 376) | 233.34 | 233.34 | 233.34 |
| Water | 74.11 | 74.11 | 74.11 |
| Colloid 643 | 2.03 | 2.03 | 2.03 |
| Batch Totals: | 1182.35 | 1162.04 | 1172.17 |
| P.V.C., % | 61.4 | 61.4 | 61.4 |

Note:
*Grind components were high speed dispersed for 10 minutes.
**This 60/40 pigment blend = product slurry C of Table XIX-a.

II) Paint Properties:

| Wet Paint Properties: | A | B | C |
|---|---|---|---|
| Solids, % | 54.16 | 53.35 | 54.94 |
| Viscosity, Krebs Units | 80 | 76 | 81 |
| Fineness of Grind, Hegman | 3.5 | 4.0 | 3.5 |
| Dry Film Properties: | | | |
| Directional Reflectance, Y Value, % | 90.9 | 92.2 | 91.2 |
| Contrast Ratio | 0.976 | 0.979 | 0.980 |
| Relative Tint Strength, % | 0.0 | +4.1 | +2.1 |
| Sheen, White Substrate, 85° | 3.3 | 2.2 | 3.4 |
| Gloss, White Substrate, 60° | 3.4 | 3.2 | 3.4 |
| Scrub Resistance, cycles | 163 | 273 | 151 |
| Porosity, Retained Reflectance, % | 91.1 | 85.7 | 90.8 |

The invention has been described with reference to certain preferred embodiments. However, it is obvious variations thereon will become apparent to those skilled in the art, the invention is not to be considered as limited thereto.

We claim:

1. A modified clay product consisting essentially of the reaction product of a kaolin clay having a BET surface area not greater than 34 m$^2$/g and colloidal silica.

2. The modified clay product according to claim 1, wherein the kaolin clay is selected from the group consisting of delaminated clay, No, 1 fine grade and No. 2 grade Cretaceous clays, No. 1 fine grade and No. 2 grade Tertiary clays, calcined kaolin clay, and mixtures thereof.

3. The modified clay product according to claim 1, wherein the kaolin clay is reacted with about 0.2 to 12 wt. % of colloidal silica, said modified clay product being substantially nonstructured or being a structured aggregate clay product depending on the weight percent of colloidal silica, the colloidal silica having an average particle size of 100 nm or less.

4. The modified clay product according to claim 3, wherein the kaolin clay is reacted with about 0.5 to 5.0 wt. % of colloidal silica having an average particle size of less than 25 nm.

5. The modified clay product according to claim 3, wherein the modified clay product has a BET surface area of about 1–30 m$^2$/g higher than the BET surface area of the starting kaolin clay.

6. A structured aggregate composite clay product which comprises a modified clay product consisting essentially of the reaction product of a kaolin clay having a BET surface area not greater than 34 m$^2$/g colloidal silica, and inorganic spacer particles separating platelets of the kaolin clay, the spacer particles and being substantially in the form of blocks or spheres, and having a median particle size of about 0.2–0.3 microns.

7. A composite clay product according to claim 6, wherein the spacer particles are fine particles of TiO$_2$, SiO$_2$, ZrO$_2$ Al(OH)$_3$, CaCO$_3$, or mixtures thereof.

8. A composite clay product according to claim 7, wherein the reaction product is formed by the reaction of kaolin clay, colloidal silica and TiO$_2$ pigment in ratios of about 74–93 parts by weight kaolin clay, about 0.2 to 12 parts by weight colloidal silica and about 3–25 parts by weight TiO$_2$ pigment, wherein the colloidal silica has an average particle size of 100 nm or less.

9. A composite clay product according to claim 8, wherein the reaction product is formed by reaction of 82–89 parts by weight kaolin clay, 1–3 parts by weight colloidal silica and 10–15 parts by weight TiO$_2$ pigment.

10. A composite clay product according to claim 8, wherein the colloidal silica reagent has a SiO$_2$ content of about 15–50 wt. %, a specific surface area of about 140–360 m$^2$/g, and an average particle size of about 7–22 nm.

11. The modified clay product according to claim 1 in dry powder form.

12. A composite clay product according to claim 6, wherein the spacer particle is Anatase or Rutile titanium dioxide pigment.

13. A composite clay product according to claim 6, wherein the kaolin clay is selected from the group consisting of high brightness No. 1 clays, high brightness No. 2 clays, high brightness delaminated clays, high brightness calcined clays and mixtures thereof.

14. A modified clay product according to claim 1 contained in an aqueous medium.

15. A composite clay product according to claim 6 contained in an aqueous medium.

16. A composite clay product according to claim 8 contained in an aqueous medium.

17. An aqueous slurry resulting from a make-down of a spray dried modified clay product, comprising water and about 50–75 wt. % of a spray dried modified clay product consisting essentially of a reaction product of a kaolin clay having a BET surface area not greater than 34 m$^2$/g and about 0.5–2.5 wt. % of colloidal silica, said slurry having been subjected to high shear attrition to provide a substantially nonstructured clay product, and said slurry having improved high shear Hercules viscosity properties relative to an equal weight solids slurry of said kaolin clay.

18. An aqueous slurry according to claim 17, wherein the kaolin clay is reacted with 1.0–1.5 wt. % of colloidal silica.

19. An aqueous slurry according to claim 17, wherein the kaolin clay is selected from the group consisting of delaminated clay, No. 1 fine grade and No. 2 grade Cretaceous clays, No. 1 fine grade and No. 2 grade Tertiary clays, calcined kaolin clay and mixtures thereof.

20. An aqueous slurry resulting from a make-down of a structured aggregate composite clay product, comprising water and about 50–75 wt. % of a spray dried structured composite clay product comprising a modified clay product consisting essentially of a reaction product of about 74–93 parts by weight of kaolin clay and about 0.5–5.0 parts by weight of colloidal silica, and about 3–25 parts by weight of TiO$_2$ pigment, said slurry make-down having been subjected to high shear mixing, and said structured aggregate composite clay product slurry having a high shear Hercules viscosity of at least 18/500 rpm (A-Bob/1100 rpm) at a solids content of 67 weight percent.

21. An aqueous slurry according to claim 20, wherein the colloidal silica content is in the range of about 1 to 3 parts by weight.

22. An aqueous slurry according to claim 20, wherein the kaolin clay is selected from the group consisting of delaminated clay, No. 1 fine grade and No. 2 grade Cretaceous clays, No. 1 fine grade Tertiary clays, calcined kaolin clays and mixtures thereof.

23. A clay product comprising a blend of the modified clay product of claim 1 with a clay selected from the group consisting of hydrous kaolin clay, calcined kaolin clay and structured sodium aluminosilicates.

24. A clay product according to claim 23, wherein the blend comprises from 1–99% by weight of the modified clay product.

25. A clay product comprising a blend of the structured aggregate composite clay product of claim 6 with a clay selected from the group consisting of hydrous kaolin clay, calcined kaolin clay, and structured aluminosilicates.

26. A clay product according to claim 25, wherein the blend comprises from 1–99% by weight of the structured aggregate composite clay product.

27. A clay product comprising a blend of the structured aggregate composite clay product of claim 8 with a clay selected from the group consisting of hydrous kaolin clay, calcined kaolin clay, and structured sodium aluminosilicates.

28. A clay product of claim 23 in slurry form.

29. A clay product of claim 25 in slurry form.

30. A clay product of claim 27 in slurry form.

31. A composition comprising paper and about 1–25 wt. % of a paper pigment, said paper pigment being the modified clay product of claim 1.

32. A composition comprising paper and about 1–25 wt. % of a paper pigment, said paper pigment being the structured aggregate composite clay product of claim 6.

33. A composition comprising paper and about 1–25 wt. % of a paper pigment, said paper pigment being the structured aggregate composite clay product of claim 8.

34. A method for preparation of a modified clay product which comprises contacting a kaolin clay having a SET surface area not greater than 34 m$^2$/g in slurry form with colloidal silica under low shear mixing conditions and then spray drying the resulting reactant mixture at temperatures sufficient to cause reaction between said kaolin clay and said colloidal silica to form a dry modified clay product consisting essentially of the kaolin clay and the colloidal silica wherein said colloidal silica acts as an inorganic binder.

35. A method according to claim 34, wherein the kaolin clay is reacted with about 0.2–12.0 wt. % of colloidal silica.

36. A method according to claim 34, wherein the kaolin clay is reacted with about 0.5 to 5.0 wt. % of colloidal silica.

37. A method according to claim 34, wherein the dry modified clay product is subjected to make-down in water under conditions of high shear attrition to form a product slurry of about 50–75 wt. % solids comprising a substantially nonstructured clay product, said product slurry having improved high shear Hercules viscosity properties relative to an equal weight solids slurry of said clay.

38. A method for the production of a dry structured aggregate composite clay product which comprises forming an aqueous mixture of kaolin clay having a BET surface area not greater than 34 m$^2$/g, colloidal silica and inorganic spacer particles separating platelets of the kaolin clay, the spacer particles being selected from the group consisting of TiO$_2$, SiO$_2$, ZrO$_2$, Al(OH)$_3$, CaCO$_3$, and mixtures thereof, and spray drying the reactant mixture at temperatures sufficient to cause reaction between said clay and said colloidal silica to form a dry structured aggregate composite clay product consisting essentially of the reaction product of the kaolin clay and the colloidal silica, and the inorganic spacer.

39. A method according to claim 38, wherein said spacer particles and colloidal silica are added substantially simultaneously to the kaolin clay slurry via a continuous in-line injection system and thereafter the resultant reactant mixture is introduced into a spray drier maintained at said temperatures to produce the dry structured aggregate composite clay product.

40. A method according to claim 38, wherein the dry structured aggregate composite clay product is formed by the reaction of the kaolin clay, the colloidal silica and TiO$_2$ pigment as said inorganic spacer particle in ratios of about 74–93 parts by weight clay, about 0.2 to 12 parts by weight colloidal silica and about 3–25 parts by weight TiO$_2$ pigment.

41. A method according to claim 38, wherein the colloidal silica reagent has an SiO$_2$ content of about 15–50 wt. %, a specific surface area of about 140–360 m$^2$/g, and an average particle size of about 7–22 nm.

42. A method according to claim 38, wherein the dry structured aggregate composite clay product is subjected to make-down in water under conditions of high shear mixing to form a structured clay product slurry of about 50–75 wt. % solids, said structured clay product slurry having a high shear Hercules viscosity of at least 18±500 rpm (A-Bob/ 1100 rpm) at a solids content of 67 weight percent.

43. An article of manufacture comprising paper and a paper coating comprising the modified clay product of claim 1.

44. An article of manufacture comprising paper and a paper coating comprising the structured aggregate composite clay product of claim 6.

45. An article of manufacture comprising paper and a paper coating comprising the structural aggregate composite clay product of claim 8.

46. An article of manufacture comprising paper and a paper coating comprising the clay product blend of claim 23.

47. An article of manufacture comprising paper and a paper coating comprising the clay product blend of claim 25.

48. An article of manufacture comprising paper and a paper coating comprising the clay product blend of claim 27.

49. An article of manufacture comprising paper and a paper coating comprising the substantially nonstructured clay product slurry of claim 17.

50. An article of manufacture comprising paper and a paper coating comprising the substantially non-structured clay product slurry of claim 17 blended with a clay selected from the group consisting of hydrous kaolin clay, calcined kaolin clay, structured sodium aluminosilicates, and mixtures thereof.

51. A paper board coated with a coating composition, said coating composition having a clay pigment therein, said clay pigment comprising 1–50 weight % of the clay product of claim 27 blended with a kaolin clay having a Tappi brightness greater than 90 and a median particle size less than 2 microns as defined by laser light scattering.

52. A latex paint containing a filler pigment, said filler pigment comprising the structured aggregate composite clay product of claim 6.

53. A latex paint composition according to claim 52, wherein said filler pigment comprises a blend of the structured aggregate composite clay product with a clay selected from the group consisting of hydrous kaolin clay, calcined kaolin clay and structured sodium aluminosilicates.

54. A latex paint according to claim 53, wherein said filler pigment comprises a blend of about 60 wt. % of a delaminated kaolin clay and about 40 wt. % of the structured composite clay product.

55. A method for improving the high shear slurry viscosity of a kaolin clay comprising reacting said kaolin clay with colloidal silica in an amount ranging from about 0.5–2.5% by weight, based on said kaolin clay to form a modified clay product consisting essentially of a reaction product of the kaolin clay and the colloidal silica.

56. A method according to claim 55, wherein the kaolin clay is reacted with about 1.0 to about 1.5% by weight of colloidal silica.

57. A method for reducing the total TiO$_2$ content of TiO$_2$ coated paper, which method comprises coating said paper with the clay product of claim 27, wherein coating of said paper with said composition decreases the amount of TiO$_2$ pigment in said paper without loss of opacity.

58. A method for decreasing the coating binder demand for paper board products, which method comprises treating said paper board products with a coating composition having a clay pigment therein, said clay pigment comprising 1–50 wt. % of the clay product of claim 27 blended with a medium or high brightness, fine particle size, No. 1 grade kaolin clay, whereby said coating composition reduces the amount of binder required for a predetermined coating strength.

59. A composite clay product according to claim 8 which has an oil absorption value in g/100 grams no higher than the kaolin clay and a low total pore structure as defined by mercury intrusion porosimetry.

60. A composite product according to claim 59 which has an oil absorption value of less than about 50 g/100 grams.

61. A composite clay product according to claim 59 which has a total pore volume of about 0.8–1.4 ml/g.

62. A composite clay product according to claim 6 which has an oil absorption value of less than about 50 g/100 grams and a total pore volume of about 0.8–1.4 ml/g.

63. A composite clay product according to claim 8, wherein the kaolin clay is a mixture of hydrous kaolin clay and calcined kaolin clay and wherein the composite clay product is structured.

64. A composite clay product according to claim 6 in dry powder form.

65. A composite clay product according to claim 8 in dry powder form.

66. A composite clay product according to claim 63 in dry powder form.

67. A composition comprising paper and about 1–25 wt. % of a paper pigment, said paper pigment being the structured aggregate composite clay product of claim 63.

68. A composition comprising paper and about 1–25 wt. % of a paper pigment, said paper pigment being the clay product blend of claim 23.

69. A composition comprising paper and about 1–25 wt. % of a paper pigment, said paper pigment being the clay product blend of claim 25.

70. A composition comprising paper and about 1–25 wt. % of a paper pigment, said paper pigment being the clay product blend of claim 27.

71. A method according to claim 34, wherein the spray drying step employs an inlet air temperature of about 1000°–1100° F.

72. A method for preparation of a modified clay product which comprises contacting a kaolin clay having a BET surface area not greater than 34 m$^2$/g in slurry form with a substantially nonstructuring amount of colloidal silica under low shear mixing conditions and then spray drying the resulting reactant mixture at temperatures sufficient to cause reaction between said kaolin clay and said colloidal silica to form a dry modified clay product consisting essentially of a reaction product of the kaolin clay and the colloidal silica.

73. A method according to claim 72, wherein the dry modified clay product is subjected to make-down in water under conditions of high shear attrition to form a product slurry of about 50–75 wt. % solids comprising a nonstructured modified clay product, said product slurry having improved high shear Hercules viscosity properties relative to an equal weight solids slurry of said clay.

74. A method according to claim 38, wherein the spacer particles are substantially in the form of blocks or spheres and have a median particle size of about 0.2–0.3 microns.

75. A modified clay product consisting essentially of the reaction product of a kaolin clay having a BET surface area not greater than 34 m$^2$/g and a substantially nonstructuring amount of colloidal silica.

76. A method for reducing the total TiO$_2$ content of TiO$_2$ coated paper board, which method comprises coating said paper board with a coating composition having a clay pigment therein, said clay pigment comprising 1–50 wt. % of the clay product of claim 27 blended with a having a Tappi brightness greater than 90 and a median particle size less than 2 microns as defined by laser light scattering, wherein coating of said paper board with said composition decreases the amount of TiO$_2$ pigment in said paper board without loss of opacity.

77. A composite clay product according to claim 6, wherein the reaction product is formed by the reaction of about 0.2 to 12 parts by weight colloidal silica, about 3–25 parts by weight TiO$_2$ pigment, and a balance of kaolin clay.

78. An aqueous slurry make-down of a structured clay product consisting essentially of comprising water and about 50–75 wt. % of the spray dried structured reaction product of about 0.5–5.0 parts by weight of colloidal silica, about 3–25 parts by weight of TiO$_2$ pigment, and a balance of kaolin clay, said slurry make-down having been subjected to high shear mixing, and said structured clay product slurry having a high shear Hercules viscosity of at least 18±500 rpm (A-Bob/1100 rpm) at a solids content of 67 weight percent.

79. An article of manufacture comprising paper and a paper coating comprising the composite clay product of claim 6.

80. An article of manufacture comprising paper and a paper coating comprising the modified clay product of claim 75.

81. An article of manufacture comprising paper and a paper coating comprising the clay product blend of claim 25.

82. An article of manufacture comprising paper and a paper coating comprising the clay product blend of claim 27.

83. A modified clay product according to claim 75 in dry powder form.

84. An aqueous slurry resulting from a make-down of a spray dried modified clay product, comprising water and about 50–75 wt. % of a spray dried modified clay product consisting essentially of the reaction product of a kaolin clay having a BET surface area not greater than 34 m$^2$/g and a substantially nonstructuring amount of colloidal silica, said slurry having been subjected to high shear attrition to provide a substantially nonstructured product, and said slurry having improved high shear Hercules viscosity properties relative to an equal weight solids slurry of said clay.

* * * * *